(12) United States Patent
Chang et al.

(10) Patent No.: US 12,526,437 B2
(45) Date of Patent: Jan. 13, 2026

(54) ENHANCED RESOLUTION GENERATION AT DECODER

(71) Applicant: QUALCOMM Incorporated, San Diego, CA (US)

(72) Inventors: Hua-I Chang, Irvine, CA (US); Khalid Tahboub, San Diego, CA (US); Yasutomo Matsuba, San Diego, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 18/177,942

(22) Filed: Mar. 3, 2023

(65) Prior Publication Data

US 2024/0298016 A1    Sep. 5, 2024

(51) Int. Cl.
| | |
|---|---|
| *H04N 19/30* | (2014.01) |
| *H04N 19/159* | (2014.01) |
| *H04N 19/176* | (2014.01) |
| *H04N 19/46* | (2014.01) |

(52) U.S. Cl.
CPC .......... *H04N 19/30* (2014.11); *H04N 19/159* (2014.11); *H04N 19/176* (2014.11); *H04N 19/46* (2014.11)

(58) Field of Classification Search
CPC .... H04N 19/159; H04N 19/176; H04N 19/30; H04N 19/42; H04N 19/46; H04N 19/513; H04N 19/59
See application file for complete search history.

(56) References Cited

U.S. PATENT DOCUMENTS

| | | | |
|---|---|---|---|
| 2007/0086515 A1* | 4/2007 | Kirkenko ............... | H04N 19/36 375/240.1 |
| 2010/0111167 A1* | 5/2010 | Wu ....................... | H04N 19/186 375/E7.243 |
| 2012/0257675 A1* | 10/2012 | Wang ..................... | H04N 19/33 375/E7.243 |
| 2018/0174275 A1* | 6/2018 | Bourdev .......... | G06V 30/19147 |
| 2020/0145697 A1 | 5/2020 | Zhang et al. | |
| 2020/0327702 A1* | 10/2020 | Wang ................... | H04N 19/102 |

(Continued)

OTHER PUBLICATIONS

Hong D., et al., "Scalability Support in HEVC," Joint Collaborative Team on Video Coding (JCT-VC) of ITU-T SG16 WP3 and ISO/IEC JTC1/SC29/WG11, MPEG Meeting, 6th Meeting: Torino, IT, Jul. 14, 2011-Jul. 22, 2011, Jul. 1, 2011, XP030009313, No. JCTVC-F290, pp. 1-15, The whole document.

(Continued)

*Primary Examiner* — Shahan Ur Rahaman
(74) *Attorney, Agent, or Firm* — QUALCOMM Incorporated; Espartaco Diaz Hidalgo

(57) ABSTRACT

A device includes a decoder that includes a spatial prediction engine, a temporal prediction engine, a reconstruction engine, and a decoded picture buffer. The device also includes a controller configured to cause the decoder to, in a base resolution mode, reconstruct a base resolution version of a block of a frame using the reconstruction engine and at least one of the spatial prediction engine or the temporal prediction engine. The controller is also configured to cause the decoder to, in an enhanced resolution mode, generate an enhanced resolution version of the block using the reconstruction engine and the at least one of the spatial prediction engine or the temporal prediction engine.

30 Claims, 12 Drawing Sheets

(56) References Cited

U.S. PATENT DOCUMENTS

2022/0141488 A1* 5/2022 He ................. H04N 19/172
                                                  375/240.12
2023/0269395 A1* 8/2023 Yang ............... H04N 19/33
                                                  375/240.21

OTHER PUBLICATIONS

International Search Report and Written Opinion—PCT/US2024/017260—ISA/EPO—Jun. 5, 2024.
Schwarz H., et al., "Overview of the Scalable Video Coding Extension of the H.264/AVC Standard", IEEE Transactions on Circuits and Systems for Video Technology, vol. 17, No. 9, Sep. 1, 2007, pp. 1103-1120, XP055289615, USA, The whole document.
Zhang Z., et al., "Fast: A Framework to Accelerate Super-Resolution Processing on Compressed Videos", 2017 IEEE Conference on Computer Vision and Pattern Recognition Workshops, Jul. 21-26, 2017, pp. 1015-1024.

* cited by examiner

ENHANCED RESOLUTION GENERATION AT DECODER

I. FIELD

The present disclosure is generally related to decoding data and generating an enhanced resolution version of the decoded data.

II. DESCRIPTION OF RELATED ART

Advances in technology have resulted in the increasing prevalence of high resolution display devices, such as for televisions and portable electronic devices. However, high resolution video content may not be available at a high resolution display device, such as when the video resolution is limited by available transmission bandwidth. In such cases, upsampling may be performed at the display device for playback at a higher resolution at the display.

The quality of upsampled video can be limited by the amount of computational resources that are available for upsampling. For devices with a relatively low amount of available computational resources, low-complexity upsampling techniques such as simple interpolation and filtering with added sharpening may be performed; however, the resulting visual quality may be unsatisfactory. Higher complexity techniques such as super resolution can provide higher visual quality by exploiting the non-local similarity of patches or learning a mapping that relates pixels from the low-resolution videos to pixels of high-resolution videos from external datasets. However, super resolution algorithms are computationally more expensive and slower than simple interpolation/filtering, and the amount of power and computational resources required to perform real-time super resolution computations may be prohibitive for use on portable consumer devices.

III. SUMMARY

According to one implementation of the present disclosure, a device includes a decoder that includes a spatial prediction engine, a temporal prediction engine, a reconstruction engine, and a decoded picture buffer. The device also includes a controller configured to cause the decoder to, in a base resolution mode, reconstruct a base resolution version of a block of a frame using the reconstruction engine and at least one of the spatial prediction engine or the temporal prediction engine. The controller is also configured to cause the decoder to, in an enhanced resolution mode, generate an enhanced resolution version of the block using the reconstruction engine and the at least one of the spatial prediction engine or the temporal prediction engine.

According to another implementation of the present disclosure, a method includes reconstructing, at a decoder, a base resolution version of a block of a frame using a reconstruction engine and at least one of a spatial prediction engine or a temporal prediction engine of the decoder. The method also includes, after reconstructing the base resolution version of the block, changing an operating mode of the decoder from a base resolution mode to an enhanced resolution mode and generating, at the decoder, an enhanced resolution version of the block using the reconstruction engine and the at least one of the spatial prediction engine or the temporal prediction engine.

According to another implementation of the present disclosure, a non-transitory computer-readable medium includes instructions that, when executed by one or more processors, cause the one or more processors to reconstruct, at a decoder, a base resolution version of a block of a frame using a reconstruction engine and at least one of a spatial prediction engine or a temporal prediction engine of the decoder. The instructions, when executed by the one or more processors, also cause the one or more processors to, after reconstructing the base resolution version of the block, change an operating mode of the decoder from a base resolution mode to an enhanced resolution mode and generate, at the decoder, an enhanced resolution version of the block using the reconstruction engine and the at least one of the spatial prediction engine or the temporal prediction engine.

According to another implementation of the present disclosure, an apparatus includes means for decoding including reconstructing, in a base resolution mode, a base resolution version of a block of a frame using a reconstruction engine and at least one of a spatial prediction engine or a temporal prediction engine and generating, in an enhanced resolution mode, an enhanced resolution version of the block using the reconstruction engine and the at least one of the spatial prediction engine or the temporal prediction engine. The apparatus also includes means for controlling an operating mode of the means for decoding.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
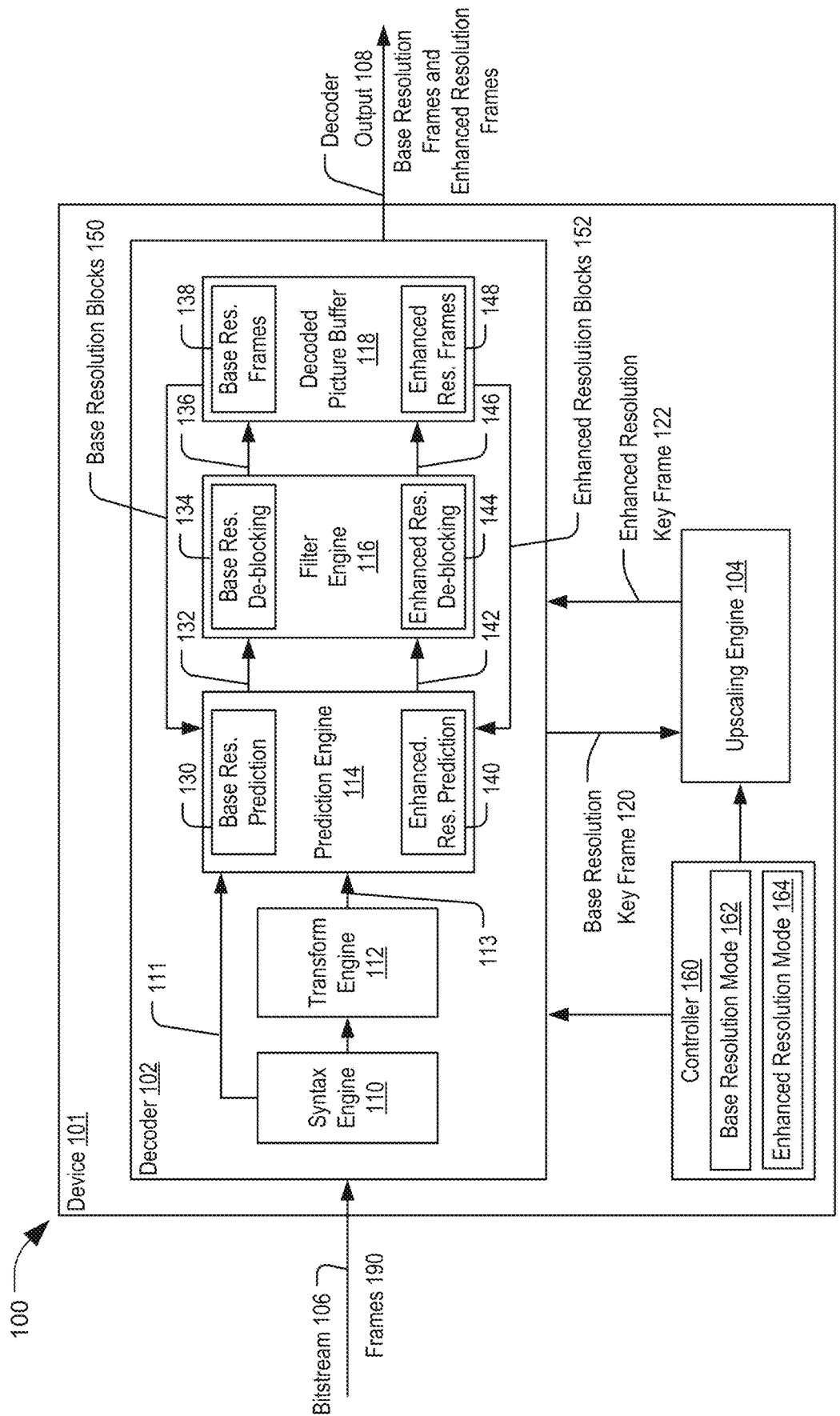
FIG. 1 is a block diagram of a particular illustrative aspect of a system operable to perform decoding and enhanced resolution generation at a decoder, in accordance with some examples of the present disclosure.

Although high resolution displays are increasingly common for both televisions and portable devices, often available video content has a lower resolution than the capacity of the display. Although high quality upsampling techniques such as super resolution exist, such techniques may be unavailable due to the large processing speed and power requirements associated with real time video processing. As a result, a user may only be able to watch video at a lower resolution or quality than is supported by the user's display device, which may negatively impact the user's viewing experience.

Systems and methods of enhanced resolution generation at a decoder are disclosed. According to some aspects, an adaptive transfer technique is used to significantly reduce the amount of processing speed and power required for performing high quality, real time upscaling (e.g., super resolution) to generate enhanced resolution video. A decoder is configured to decode a bitstream representing video frames and reconstruct the video frames having a base resolution that is associated with the video encoding that generated the bitstream. The decoder is also configured to apply adaptive transfer that re-uses motion compensation information received in the bitstream to generate upscaled frames with enhanced resolution, such as super resolution frames.

An upscaler device, such as a neural processing unit that includes a machine learning model, can process a first frame (a "key frame") of the reconstructed video frames that has the base resolution to generate an enhanced resolution version of the key frame. The decoder uses the enhanced resolution version of the key frame as a source of enhanced resolution blocks of pixels to generate an enhanced resolution version of a next frame, thus exploiting the temporal correlation between adjacent frames so that only a subset of the frames are offloaded to the upscaler device as key frames. The transfer of enhanced resolution pixels from prior frames during generation of subsequent frames has a negligible computation cost as it uses information already embedded in the compressed video (e.g., motion vectors and residuals).

According to an aspect, the components of the decoder that are used to reconstruct the base resolution frames by applying motion compensation for blocks of the base resolution key frame are also used to generate the enhanced resolution version of the next frame by applying motion compensation for blocks of the enhanced resolution key frame. The present techniques thus include use of a common core for video decoding and performing enhanced resolution in which components (e.g., hardware blocks) of the decoder are reused. In an illustrative example, reusing the hardware blocks can reduce a video engine area by 15%-20% and also result in an average bandwidth savings of approximately 16% as compared to implementations in which the video decoding and the enhanced resolution using adaptive transfer are performed at different hardware blocks.

According to another aspect, a determination is made whether to apply motion compensation or to instead apply upscaling (e.g., bicubic interpolation) for each block within an enhanced resolution frame. For example, because generating a sequence of enhanced resolution frames using motion compensation can result in errors that accumulate with each sequentially generated enhanced resolution frame, a comparison is made for each block that determines if an energy metric for the block (e.g., an energy of the residual for the block) is less than a dynamic threshold. In some implementations, the dynamic threshold is computed for each frame based on a decay factor to model error propagation and also based on a transfer distance from the nearest key frame (e.g., a count of how many frames have been generated since the last enhanced resolution key frame). Making the determination based on the decay factor and the transfer distance reduces an amount of cache memory usage as compared to implementations in which the decision to skip motion transfer is made by storing the cumulative residual errors for each coding unit of each reference frame that is used for motion compensation and comparing the cumulative residual errors to a threshold.

By using components of the decoder as a common core for decoding as well as for enhanced resolution generation, in addition to determining whether to apply motion compensation for each block based on a decay factor and transfer distance, the disclosed systems and methods provide the technical advantages of reduced power consumption, reduced video engine area, reduced bandwidth usage, and reduced cache usage.

Figure 17:
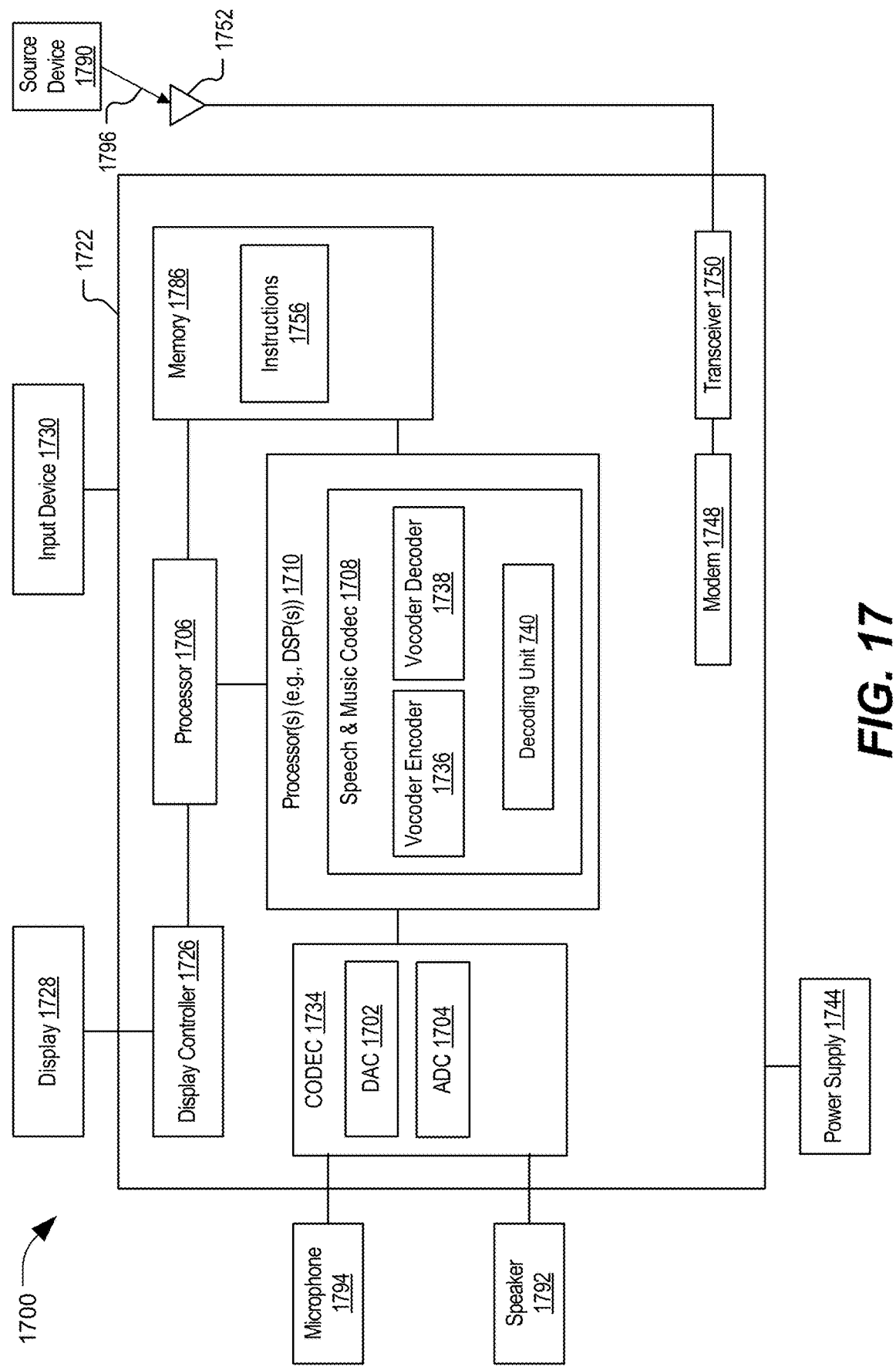
FIG. 17 is a block diagram of a particular illustrative example of a device that is operable to perform enhanced resolution generation at a decoder, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 17 depicts a device 1700 including one or more processors ("processor(s)" 1710 of FIG. 17), which indicates that in some implementations the device 1700 includes a single processor 1710 and in other implementations the device 1700 includes multiple processors 1710. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple upscalers are illustrated and associated with reference numbers 220A, 220B, and 220C. When referring to a particular one of these upscalers, such as an upscaler 220A, the distinguishing letter "A" is used. However, when referring to any arbitrary one of these upscalers or to these upscalers as a group, the reference number 220 is used without a distinguishing letter.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of a particular illustrative aspect of a system 100 operable to perform decoding and enhanced resolution generation at a decoder 102. The system 100 includes a device 101 that includes the decoder 102, an upscaling engine 104, and a controller 160. The device 101 is configured to receive a bitstream 106 that includes a representation of a sequence of frames 190 and to process the bitstream 106 to generate a decoder output 108. According to an aspect, the device 101 processes the bitstream 106 to reconstruct a base resolution version of the frames 190 (e.g., 480p or 720p) according to information received in the bitstream 106 and also generates an enhanced resolution version of the frames 190. The base resolution version of the frames 190, the enhanced resolution version of the frames 190, or both, can be provided in the decoder output 108, which may be sent to a display device for playback.

The decoder 102 includes a syntax engine 110, a transform engine 112, a prediction engine 114, a filter engine 116, and a decoded picture buffer 118. According to a particular implementation, the syntax engine 110 is configured to perform decoding of the bitstream 106 to extract quantized coefficients, motion vectors, and other syntax elements. The motion vectors and other syntax elements may be forwarded as data 111 to the prediction engine 114.

The transform engine 112 is configured to perform an inverse transform on portions of the bitstream 106. In an illustrative example, the transform engine 112 performs an inverse transform (e.g., an inverse discrete cosine transform (DCT), an inverse integer transform, an inverse Karhunen-Loeve transform (KLT), etc.) on a coefficient block from the bitstream 106 to produce residual blocks in the pixel domain which are provided as data 113 for use by the prediction engine 114.

The prediction engine 114 is configured to generate predicted blocks of a frame based on information from the bitstream 106. For example, the prediction engine 114 may perform intra-prediction processing that generates prediction data (e.g., a predicted block) for a block based on a signaled intra-prediction mode and data from previously decoded blocks of the current frame or picture. As another example, the prediction engine 114 may perform inter-prediction processing that produces predicted blocks for a video block based on the motion vectors and other syntax elements the syntax engine 110. The predicted blocks may be produced from one or more reference frames stored in the decoded picture buffer 118, as explained further below.

The filter engine 116 is configured to perform filtering to reduce blocking artifacts associated with the coding blocks, and the resulting pixels of the reconstructed frame can be stored in the decoded picture buffer 118 and made available to the prediction engine 114 for use in generating predicted blocks for subsequent frames.

The controller 160 is configured to cause the decoder 102 to operate in a base resolution mode 162 or in an enhanced resolution mode 164. To illustrate, in the base resolution mode 162, the prediction engine 114 is configured to perform base resolution prediction 130 to generate reconstructed pixel blocks having the base resolution, illustrated as base resolution pixel blocks 132. For example, for an inter-predicted block, the prediction engine 114 may copy base resolution blocks 150 from previously reconstructed base resolution frames 138 (e.g., one or more base resolution reference frames) that are stored in the decoded picture buffer 118. As another example, for an intra-predicted block, the prediction engine 114 may use previously decoded base resolution blocks from the current frame. Also in the base resolution mode 162, the filter engine 116 is configured to perform base resolution deblocking 134 of the base resolution pixel blocks 132 to generate base resolution filtered blocks 136 of a base resolution frame. The resulting reconstructed frame can be stored in the decoded picture buffer 118 as one of the base resolution frames 138.

According to an aspect, operation of the decoder 102 in the base resolution mode 162 includes the prediction engine 114 performing enhanced resolution prediction 140 to generate reconstructed pixel blocks having the enhanced resolution, illustrated as enhanced resolution pixel blocks 142. For example, for an inter-predicted block, the prediction engine 114 may copy enhanced resolution blocks 152 from previously generated enhanced resolution frames 148 (e.g., one or more enhanced resolution reference frames) that are stored in the decoded picture buffer 118. As another example, for an intra-predicted block, the prediction engine 114 may use previously decoded enhanced resolution blocks from the current frame. Also in the enhanced resolution mode 164, the filter engine 116 performs enhanced resolution deblocking 144 of enhanced resolution pixel blocks 142 to generate enhanced resolution filtered blocks 146 an enhanced resolution frame. The resulting enhanced resolution frame can be stored in the decoded picture buffer 118 as one of the enhanced resolution frames 148.

According to an aspect, the controller 160 is also configured to offload enhanced resolution processing of selected frames, referred to as key frames, to the upscaling engine 104. For example, since performance of the enhanced resolution prediction 140 at the prediction engine 114 relies on an initial enhanced resolution frame being available from which enhanced resolution blocks may be predicted, such initial enhanced resolution frames are generated at the upscaling engine 104. According to some implementations, the controller 160 is configured to offload enhance resolution processing to the upscaling engine 104 based on the bitstream 106, such as when a current frame corresponds to an I-frame (e.g., coded without inter-prediction of blocks from a previous frame), or based on determining that a predicted error in inter-predicted blocks exceeds a threshold, as illustrative, non-limiting examples.

According to an aspect, the upscaling engine 104 is configured to receive a base resolution key frame 120 from the decoder 102 and perform upscale processing of the base resolution key frame 120 to generate an enhanced resolution key frame 122, which may be stored in the decoded picture buffer 118 as an enhanced resolution frame 148 to be available as a source of enhanced resolution blocks for inter-prediction of blocks of subsequent frames. For example, the upscaling engine 104 can perform computationally intensive processing, such as super resolution upscaling. In a particular example, the upscaling engine 104 is implemented via executing a machine learning model using one or more high-performance hardware components, such as a neural processing unit (NPU). To illustrate, the upscaling engine 104 can implement a deep neural network to perform super-resolution (e.g. a super resolution convolutional neural network (SRCNN)) that can apply several layers of convolution and non-linear functions to map the base resolution key frame 120 to the enhanced resolution key frame 122.

Figure 5:
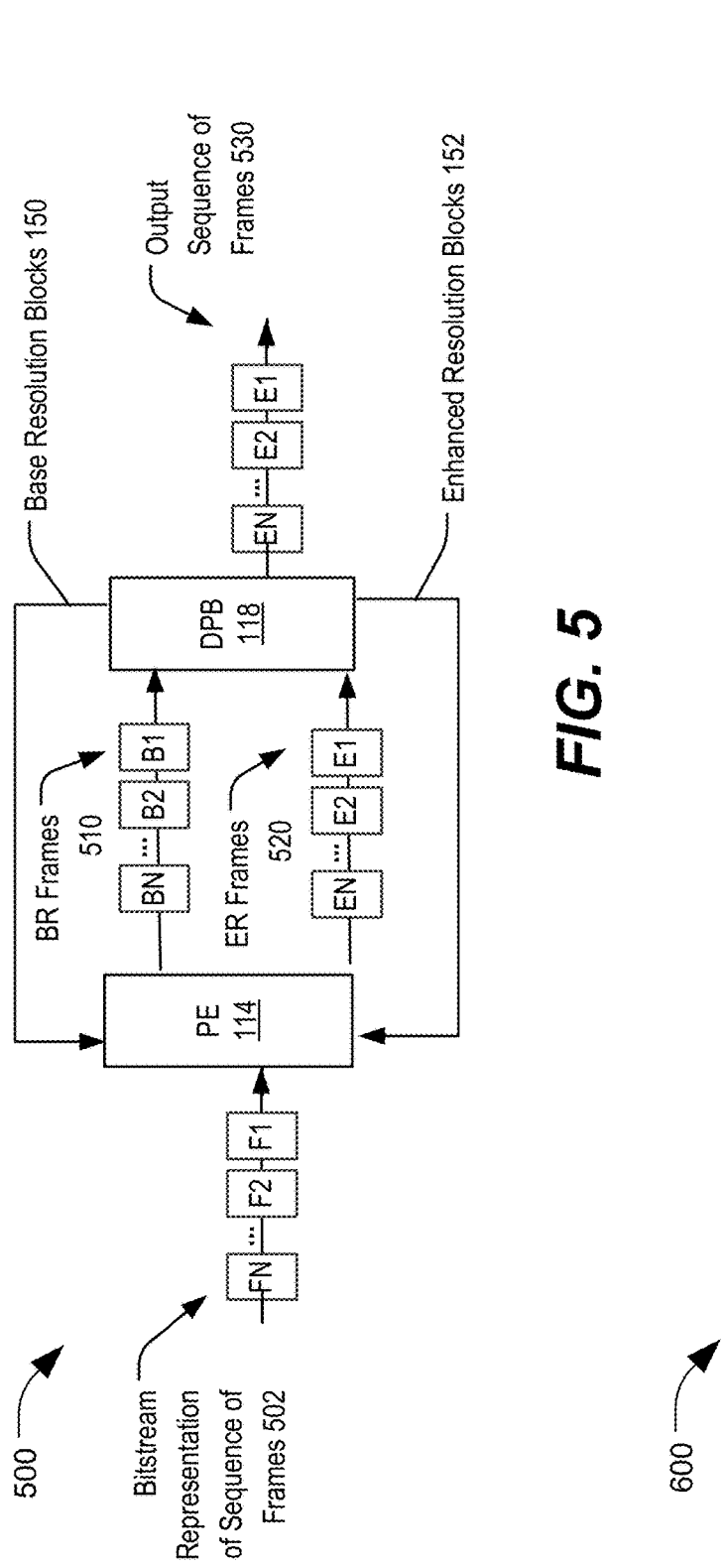
FIG. 5 is a diagram of an illustrative aspect of base resolution decoding and enhanced resolution generation at the decoder of FIG. 1, in accordance with some examples of the present disclosure.
Figure 6:
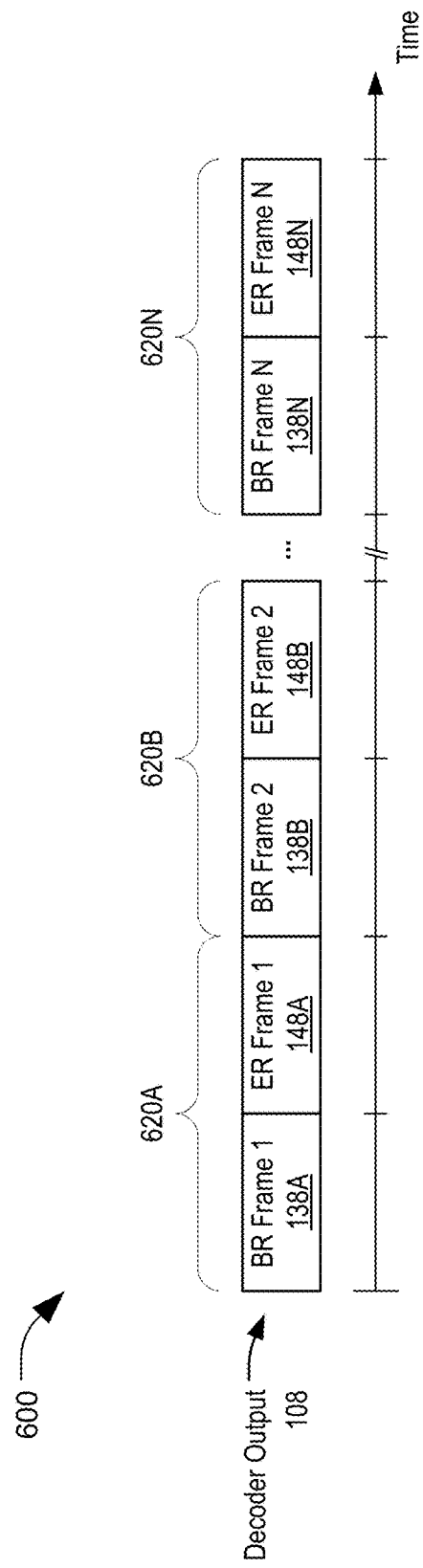
FIG. 6 is a timing diagram of base resolution decoding and enhanced resolution generation at the decoder of FIG. 1, in accordance with some examples of the present disclosure.

During operation, the decoder 102 receives, in the bitstream 106, a representation of the sequence of frames 190 and, for each particular frame of the sequence and during a single frame decoding time, reconstructs both a base resolution version of the particular frame and an enhanced resolution version of the particular frame, such as described further with reference to FIG. 5 and FIG. 6. The decoder 102 stores the base resolution version of the particular frame and the enhanced resolution version of the particular frame in the decoded picture buffer 118 to be available for use as source blocks for motion transfer during generation of base resolution versions of subsequent frames in the base resolution mode 162 and enhanced resolution versions of subsequent frames in the enhanced resolution mode 164.

In an example, the controller 160 causes the decoder 102 to operate the prediction engine 114 according to the base resolution mode 162 to generate a base resolution version of one of the frames in the sequence, which the decoder 102 stores in the decoded picture buffer 118 as one of the base resolution frames 138. After generating the base resolution version, the controller 160 causes the decoder 102 to operate the prediction engine 114 according to the enhanced resolution mode 164 to generate an enhanced resolution version of the frame, which is then stored in the decoded picture buffer 118 as one of the enhanced resolution frames 148.

After generating the base and enhanced resolution versions of the frame, the controller 160 causes the decoder 102 to operate the prediction engine 114 according to the base resolution mode 162 to generate a base resolution version of a next sequential frame in the sequence, which the decoder 102 stores in the decoded picture buffer 118 as one of the base resolution frames 138. After generating the base resolution version, the controller 160 causes the decoder 102 to operate the prediction engine 114 according to the enhanced resolution mode 164 to operate the prediction engine 114 according to the enhanced resolution mode 164 to generate an enhanced resolution version of the second particular frame, which is also stored in the decoded picture buffer 118 as one of the enhanced resolution frames 148.

When one of the frames 190 is encoded without using inter-prediction (without using blocks of previously decoded frames to predict blocks of the current frame), the controller 160 causes the decoder 102 to not generate an enhanced resolution version of that frame. Instead, the controller 160 causes the base resolution version of the frame to be provided to the upscaling engine 104 as a base resolution key frame 120 and processed by the upscaling engine 104 to generate an enhanced resolution key frame 122, which is stored as an enhanced resolution frame 148 in the decoded picture buffer 118. After generating the enhanced resolution version of the key frame, enhanced resolution versions of one or more subsequent frames can be generated by the decoder 102 in the enhanced resolution mode 164 based on blocks of the enhanced resolution version of the key frame 122.

In some implementations, the device 101 corresponds to or is included in one of various types of devices. In an illustrative example, the device 101 is integrated in an integrated circuit, as described with reference to FIG. 7. In other examples, the device 101 is integrated in at least one of a mobile phone or a tablet computer device, as described with reference to FIG. 8, a headset device, such as described further with reference to FIG. 9, a wearable electronic device, as described with reference to FIG. 10, a voice-controlled speaker system, as described with reference to FIG. 11, a camera device, as described with reference to FIG. 12, or a virtual reality, mixed reality, or augmented reality headset, as described with reference to FIG. 13. In another illustrative example, the device 101 is integrated into a vehicle, such as described further with reference to FIG. 14 and FIG. 15.

The device 101 thus enables generation of enhanced resolution frames using the information from the bitstream 106, such as residual information and motion vectors, and using the same components of the decoder 102 that are used to generate the base resolution reconstruction of the frame. Using the information from the bitstream to generate enhanced resolution frames provides the technical advantage of reduced power consumption and reducing the amount of processing resources required to generate enhanced resolution frames as compared to using the upscaling engine 104 to upscale every frame. Using the same components of the decoder 102 for decoding base resolution frames and generating enhanced resolution frames provides the technical benefit of reducing the number of components, size, and data transfer bandwidth as compared to implementations in which the bitstream data and base resolution frames 138 are transferred from the decoder 102 to another set of components for generation of the enhanced resolution frames.

Although the controller 160 is illustrated as distinct from and coupled to the decoder 102, in other implementations the controller 160 may be included in the decoder 102, such as via one or more state machines or other circuitry integrated in the decoder 102 to schedule switching between operation in the base resolution mode 162 and operation in the enhanced resolution mode 164, to detect (or select) particular frames 190 as key frames for offloading to the upscaling engine 104, etc.

Although the decoder 102 is illustrated as including the syntax engine 110, the transform engine 112, the prediction engine 114, the filter engine 116, and the decoded picture buffer 118, in other implementations the functionality described with respect to two or more of the syntax engine 110, the transform engine 112, the prediction engine 114, the filter engine 116, or the decoded picture buffer 118 may be combined into a single component. Although in some implementations one or more (or all) of the syntax engine 110, the transform engine 112, the prediction engine 114, the filter engine 116, and the decoded picture buffer 118, the controller 160, and the upscaling engine 104 may be implemented in hardware (e.g., dedicated circuitry), in other implementations one or more (or all) of the syntax engine 110, the transform engine 112, the prediction engine 114, the filter engine 116, the decoded picture buffer 118, the controller 160, and the upscaling engine 104 are implemented as one or more processors executing instructions.

Figure 2:
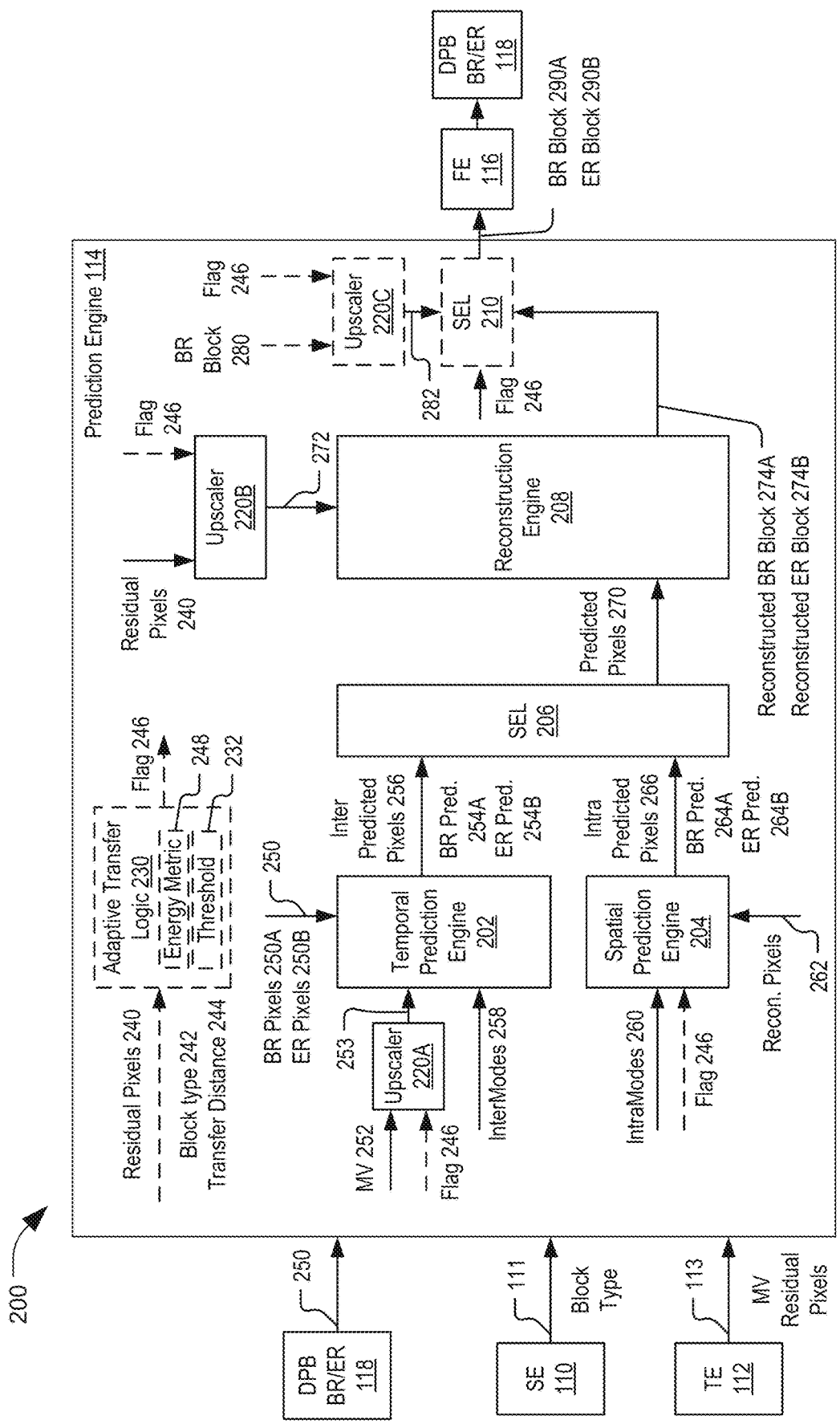
FIG. 2 is a diagram of an illustrative aspect of components of the decoder of FIG. 1, in accordance with some examples of the present disclosure.

FIG. 2 is a diagram of an illustrative aspect of components of the decoder of FIG. 1 and includes a temporal prediction engine 202, a spatial prediction engine 204, a selector 206, a reconstruction engine 208, and multiple upscalers 220 implemented in the prediction engine 114. In a particular implementation, the upscalers 220 are configured to perform relatively low-complexity upscaling, such as bicubic interpolation.

The temporal prediction engine 202 is responsive to an inter-prediction indicator ("intermodes") 258 indicating inter-prediction is to be used based on a block from a previous frame. The temporal prediction engine 202 is configured to transfer pixels 250 from the decoded picture buffer 118 based on a motion vector 252 that is received from the bitstream 106, such as from the transform engine (TE) 112, and output the resulting inter-predicted pixels 256.

According to an aspect, when operating in the base resolution mode 162, an upscaler 220A receives a motion vector 252 for a block of a currently decoded frame via a bitstream 106 and passes the motion vector 252 to the temporal prediction engine 202 without upscaling. The temporal prediction engine 202 transfers base resolution (BR) pixels 250A from the decoded picture buffer (DPB) 118 based on the motion vector 252 and outputs the inter-predicted pixels 256 as a base resolution prediction 254A for the block.

According to an aspect, when operating in the enhanced resolution mode 164, the upscaler 220A upscales the motion vector 252 to generate an upscaled motion vector 253, and the decoder 102 is configured to transfer enhanced resolution pixels based on the upscaled motion vector 253. For example, the temporal prediction engine 202 transfers enhanced resolution (ER) pixels 250B from the decoded picture buffer 118 based on the upscaled motion vector 253 and outputs the inter-predicted pixels 256 as an enhanced resolution prediction 254B for the block.

The spatial prediction engine 204 is responsive to an intra-prediction indicator ("intramodes") 260 indicating intra-prediction is to be used based on a previously reconstructed block from the current frame. The spatial prediction engine 204 is configured to transfer reconstructed pixels 262 from the prior block to generate the resulting intra-predicted pixels 266. According to an aspect, in the base resolution mode 162, the reconstructed pixels 262 correspond to base resolution pixels of a previously decoded block of the current frame, and the spatial prediction engine 204 generates a base resolution prediction 264A for the block. Alternatively, in the enhanced resolution mode 164, the reconstructed pixels 262 correspond to enhanced resolution pixels of the previously decoded block, and the spatial prediction engine 204 generates an enhanced resolution prediction 264B for the block.

The selector 206 is configured to select a first input from the temporal prediction engine 202 or a second input from the spatial prediction engine 204 to be output as predicted pixels 270 to the reconstruction engine 208. In an example, the selection is determined based on whether inter-prediction or intra-prediction is being used for the current block, such as indicated by one or both of the inter-prediction indicator 258 or the intra-prediction indicator 260. When inter-prediction is used, the predicted pixels 270 correspond to the base resolution prediction 254A in the base resolution mode 162 and correspond to the enhanced resolution prediction 254B in the enhanced resolution mode 164. When intra-prediction is used, the predicted pixels 270 correspond to the base resolution prediction 264A in the base resolution mode 162 and correspond to the enhanced resolution prediction 264B in the enhanced resolution mode 164.

The reconstruction engine 208 is configured to receive the predicted pixels 270 and generate a reconstructed block 274 based on residual pixels 240 (also referred to as a "residual"). According to an aspect, in the base resolution mode 162, the residual pixels 240 are received at the reconstruction engine 208 and are used during generation of a reconstructed base resolution block 274A. In some implementations, the residual pixels 240 are received at an upscaler 220B that is configured to pass the residual pixels 240 to the reconstruction engine 208 without upscaling, and the reconstruction engine 208 adds the residual pixels 240 to the predicted pixels 270 to generate the reconstructed base resolution block 274A. Alternatively, in the enhanced resolution mode 164, the upscaler 220B is configured to upscale the residual pixels 240 to generate an upscaled residual 272 for the block, and the reconstruction engine 208 is configured to use the upscaled residual 272 during generation of the enhanced resolution version of the block 290B (e.g., by adding the upscaled residual 272 to the predicted pixels 270).

In some implementations, the reconstructed block 274 (e.g., the reconstructed base resolution block 274A or the reconstructed enhanced resolution block 274B) is provided as an output of the prediction engine 114 to the filter engine 116.

Optionally, the prediction engine 114 includes adaptive transfer logic 230 that is configured to generate a bypass control signal, illustrated as a flag 246, based on a comparison of an energy metric 248 of a residual of the block to a dynamic threshold 232. For example, using motion transfer to generate enhanced resolution frames can result in one or more artifacts, such as a ringing artifact due to the loss of high frequency components when the residual pixels are upsampled by the upscaler 220B (e.g., using bicubic upscaling), and errors due to such artefacts can accumulate for each successive frame. In a particular implementation, the dynamic threshold 232 is based on a decay factor and a transfer distance 244 from a most recently generated enhanced resolution key frame. According to an aspect, the adaptive transfer logic 230 sets the flag 246 to a value indicating that motion transfer is to be bypassed (e.g., '0' to bypass motion transfer or '1' to perform motion transfer) based on whether the following expression is true:

$$\text{PU residual energy} > \text{THR}_{bypass} * \beta^i,$$

where PU residual energy represents the energy (e.g., Laplacian) of the residual pixels 240 for the current predicted unit (e.g., the current block), $\text{THR}_{bypass}$ is a threshold value for bypassing motion transfer, $\beta$ is a decay factor having a value less than one, and i indicates the transfer distance 244 from the most recently generated key frame (e.g., a count of how many frames have been generated based on the last enhanced resolution key frame 122). In a particular implementation, PU residual energy corresponds to the energy metric 248, and $\text{THR}_{bypass} * \beta^i$ corresponds to the dynamic threshold 232 and has a value that decreases with each successively generated frame using motion transfer.

In some implementations, the adaptive transfer logic 230 is further configured to set a value of the flag 246 based on a block type 242. For example, the adaptive transfer logic 230 can set the flag 246 to bypass motion compensation based on the block type 242 indicating that the current frame is a key frame.

According to some aspects, the prediction engine 114 is configured to bypass operation of one or more of an upscaler 220, the temporal prediction engine 202, the spatial prediction engine 204, or the reconstruction engine 208 based on the bypass control signal (e.g., the flag 246). For example, when the flag 246 has a value (e.g., '0') indicating that motion compensation is to be bypassed due to the energy metric 248 exceeding the dynamic threshold 232, the output of the prediction engine 114 may be generated as an upscaled version of the base resolution version of the block.

To illustrate, the prediction engine 114 optionally includes a selector 210 and an upscaler 220C. When the flag 246 indicates that motion compensation is not to be performed for the current block, the upscaler 220C generates an upscaled version 282 of the base resolution block 280. The selector 210 is configured, based on the flag 246, to select one of an output of the reconstruction engine 208 or the upscaled version 282 of the base resolution block 280 as an output of the prediction engine 114. To illustrate, the selector 210 selects the output of the reconstruction engine 208 when motion compensation is to be performed, and selects the upscaled version 282 when motion compensation is to be bypassed. In such cases where the upscaled version 282 is selected rather than the output of the reconstruction engine 208, power savings may be attained by deactivating (or otherwise transitioning to a reduced power usage state) one or more of the upscaler 220A, the upscaler 220B, the temporal prediction engine 202, the spatial prediction engine 204, the selector 206, or the reconstruction engine 208. Similarly, when the flag 246 indicates that motion compensation is to be bypassed because the current frame is a key frame, one or more (or all) of the components of the prediction engine 114 may be deactivated or otherwise transitioned to a low power consumption state.

During operation, in the base resolution mode 162, the prediction engine 114 functions to reconstruct a base resolution version of a block 290A of a frame using the reconstruction engine 208 and at least one of the spatial prediction engine 204 or the temporal prediction engine 202. To illustrate, based on receiving an inter-prediction indicator 258 for the block in the base resolution mode 162, the prediction engine 114 generates, at the temporal prediction engine 202, the base resolution prediction 254A of the block using the motion vector 252 to copy pixels, such as base resolution pixels 250A of the base resolution version of a reference frame, from the decoded picture buffer 118. The prediction engine 114 also generates, at the reconstruction engine 208, a base resolution reconstruction of the block (e.g., the reconstructed base resolution block 274A) based on the base resolution prediction 254A and a residual for the block (e.g., the residual pixels 240).

In the enhanced resolution mode 164, the prediction engine 114 generates an enhanced resolution version of the block 290B using the reconstruction engine 208 and the at least one of the spatial prediction engine 204 or the temporal prediction engine 202 that were used when generating the base resolution version of the block 290A. For example, in the enhanced resolution mode 164, the upscaler 220A upscales the motion vector 252 to generate the upscaled motion vector 253, the upscaler 220B upscales the residual pixels 240 to generate the upscaled residual 272, the temporal prediction engine 202 generates, at the temporal prediction engine 202, the enhanced resolution prediction 254B of the block using the upscaled motion vector 253 to copy enhanced resolution pixels 250B of an enhanced resolution version of the reference frame from the decoded picture buffer 118. In addition, the reconstruction engine 208 generates the enhanced resolution reconstruction of the block (e.g., the reconstructed enhanced resolution block 274B) based on the enhanced resolution prediction 254B and the upscaled residual 272.

By including the upscaler 220A to generate the upscaled motion vector 253 and the upscaler 220B to generate the upscaled residual 272, the prediction engine 114 can perform enhanced resolution generation using the same components (e.g., the temporal prediction engine 202, the spatial prediction engine 204, the selector 206, and the reconstruction engine 208) as are used to perform base level decoding. This provides the technical advantages of reduced chip area and reduced transfer bandwidth as compared to performing enhanced resolution generation using different components than are used to perform base level decoding. In implementations in which the optional adaptive transfer logic 230 is included in the prediction engine 114, using the flag 246 to control adaptive transfer based on the energy metric 248 provides the technical benefit of improving overall quality of a video output by replacing the output of the reconstruction engine 208, which may be expected to have perceivable artifacts due to residual error accumulation, with the upscaled version 282 of the base resolution block 280. Implementations in which the flag 246 is optionally used to deactivate one or more components of the prediction engine 114 provides the technical benefit of reducing power consumption of components that no longer contribute to generation of the enhanced resolution version of the block 290B.

Figure 3:
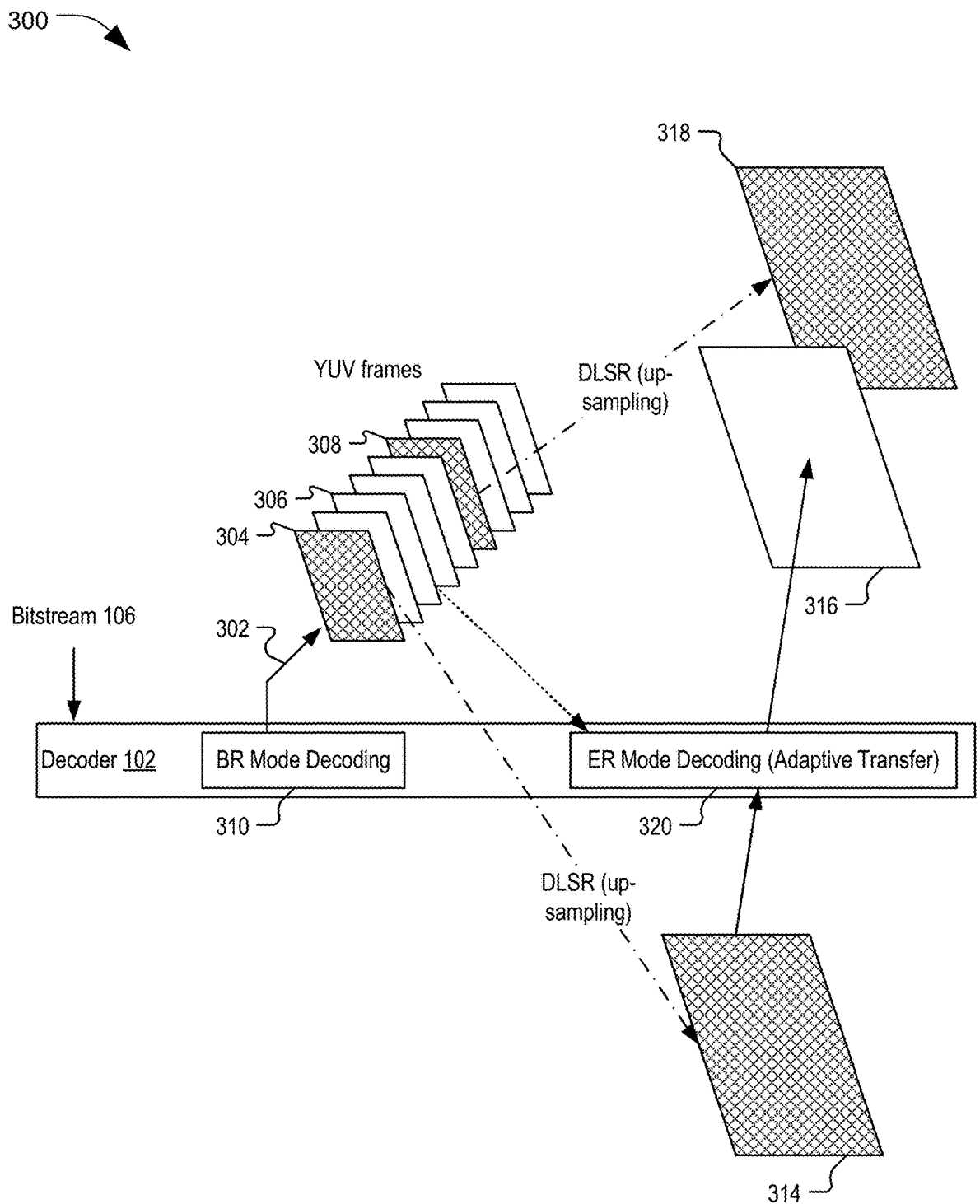
FIG. 3 is a diagram of an illustrative aspect of operations associated with the decoder of FIG. 1, in accordance with some examples of the present disclosure.

FIG. 3 is a diagram of an illustrative aspect of operations 300 associated with performing adaptive transfer at the decoder 102. The operations 300 include the decoder 102 receiving the bitstream 106 and performing base resolution mode decoding 310 (e.g., operation of the decoder 102 in the base resolution mode 162 as described above) to generate a sequence 302 of base resolution video frames (e.g., YUV frames) via operation in the base resolution mode 162.

In addition, an enhanced resolution version of each frame in the sequence 302 of base resolution video frames is generated using adaptive transfer. In particular, a sequentially first base resolution video frame 304 is designated as a key frame and is upsampled to generate a first enhanced resolution frame 314. For example, the first base resolution video frame 304 may be provided to the upscaling engine 104 of FIG. 1 as the base resolution key frame 120, and the upscaling engine 104 generates the first enhanced resolution frame 314 (e.g., using a deep learning super resolution model) as the enhanced resolution key frame 122.

For a number of video frames of the sequence 302 following the first base resolution video frame 304, the decoder 102 performs enhanced resolution mode decoding 320 (e.g., adaptive transfer corresponding to operation of the decoder 102 in the enhanced resolution mode 164 as described above) to generate a corresponding enhanced resolution frame. In the illustrated example, a third sequential video frame 306 of the sequence 302 is processed by the decoder 102 using the enhanced resolution mode decoding 320 to generate an enhanced resolution frame 316 that corresponds to an upscaled version of the third sequential video frame 306.

The decoder 102 may continue to alternate between generating a next base resolution video frame of the sequence 302 using the base resolution mode decoding 310 and generating a corresponding enhanced resolution version of that base resolution video frame using the enhanced resolution mode decoding 320 until a determination is made that a particular base resolution video frame 308 corresponds to a key frame. For example, the base resolution video frame 308 may correspond to an I-frame, or the controller 160 (or the decoder 102) may determine that the number of blocks for which motion compensation is bypassed (e.g., due to the energy metric 248 exceeding the dynamic threshold 232) exceeds a threshold. Determining that the number of blocks for which motion compensation is bypassed exceeds the threshold may trigger the controller 160 (or the decoder 102) to designate the frame as a key frame, resetting the transfer distance 244 to zero for the key frame and resetting the dynamic threshold 232. The base resolution video frame 308 is upsampled in a similar manner as described for the first base resolution video frame 304 to generate a corresponding enhanced resolution frame 318.

Figure 4:
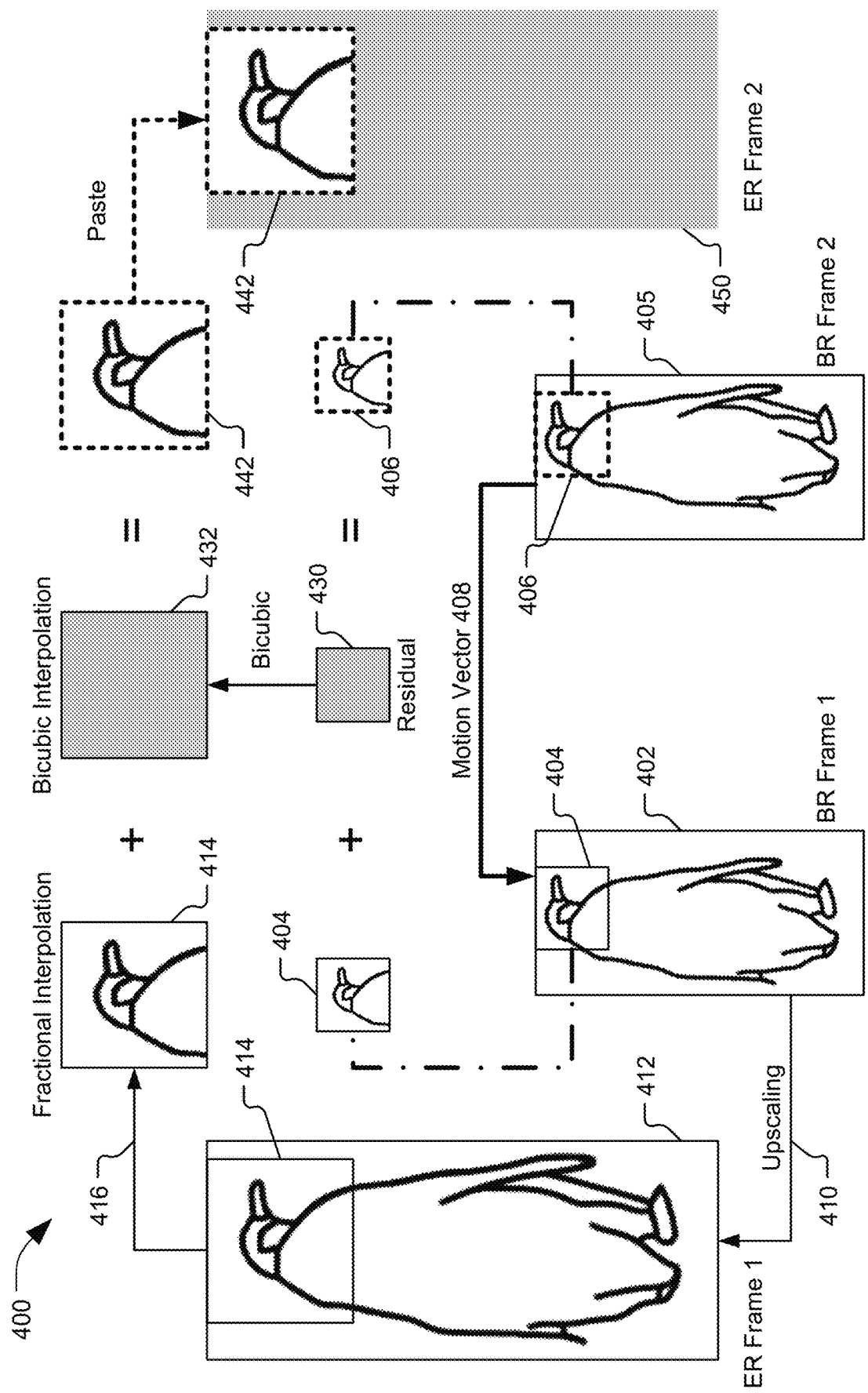
FIG. 4 is a diagram of an illustrative aspect of operations associated with the decoder of FIG. 1, in accordance with some examples of the present disclosure.

FIG. 4 is a diagram of an illustrative aspect of operations 400 performed at the decoder 102 including temporal prediction of enhanced resolution frames in the enhanced resolution mode 164. A first base resolution frame 402 is generated at the decoder 102 and upscaling 410 is performed to generate a first enhanced resolution frame 412. For example, the first enhanced resolution frame 412 may be an enhanced resolution key frame 122 generated by the upscaling engine 104 or may be an enhanced resolution frame generated by operation of the decoder 102 in the enhanced resolution mode 164.

A second base resolution frame 405 is generated at the decoder 102 using inter-prediction in the base resolution mode 162. For example, the bitstream 106 can include a motion vector 408 that maps a block 406 of the second base resolution frame 405 to a block 404 of the first base resolution frame 402. The temporal prediction engine 202 copies the block 404 from the first base resolution frame 402 in the decoded picture buffer 118 and outputs the block 404 (e.g., as the base resolution prediction 254A) to the reconstruction engine 208. The reconstruction engine 208 obtains a residual 430 from the bitstream 106 (e.g., the residual pixels 240) and adds the residual 430 to the block 404 (e.g., the base resolution prediction 254A) to generate a reconstructed base resolution block 406 for the second base resolution frame 405.

After generation of the second base resolution frame 405, the decoder 102 switches to operation in the enhanced resolution mode 164 to generate a second enhanced resolution frame 450. The decoder 102 (e.g., the upscaler 220A of the prediction engine 114) upscales the motion vector 408 and uses the upscaled motion vector for retrieving 416 the corresponding block 414 of the first enhanced resolution frame 412. For example, the temporal prediction engine 202 copies the block 414 from the first enhanced resolution frame 412 in the decoded picture buffer 118 and outputs the block 414 (e.g., as the enhanced resolution prediction 254B), which may include fractional interpolation due to upscaling, to the reconstruction engine 208. The reconstruction engine 208 obtains an upscaled residual 432 by upscaling the residual 430 (e.g., at the upscaler 220B of the prediction engine 114) and adds the upscaled residual 432 to the block 414 (e.g., the enhanced resolution prediction 254B) to generate a reconstructed enhanced resolution block 442 for the second enhanced resolution frame 450.

FIG. 5 is a diagram of an illustrative aspect of operation of components 500 of the decoder 102 of FIG. 1, in accordance with some examples of the present disclosure. The prediction engine 114 is configured to receive a bitstream representation of a sequence of frames 502 (e.g., the bitstream 106). The sequence of frames 502 are illustrated as a first frame (F1), a second frame (F2), and one or more additional frames including an Nth frame (FN) (where N is an integer greater than two). The prediction engine 114 (and/or the filter engine 116, which is not illustrated to improve clarity) is configured to output a sequence 510 of base resolution versions of the frames F1-FN, illustrated as base resolution frames B1-BN.

After each base resolution frame B1, B2, . . . BN of the sequence 510 is generated, it is stored in the decoded picture buffer 118, where it can be used as a source of base resolution blocks 150 for decoding subsequent frames of the sequence of frames 502, and the decoder 102 switches to the enhanced resolution mode 164 to generate a corresponding enhanced resolution version of the frame, resulting in a sequence 520 of enhanced resolution frames. The sequence 520 of enhanced resolution frames includes a frame E1 corresponding to an enhance resolution version of the frame B1, a frame E2 corresponding to an enhance resolution version of the frame B2, and a frame EN corresponding to an enhance resolution version of the frame BN.

After each of the frames E1-EN of the sequence 520 is generated, it is stored in the decoded picture buffer 118, where it can be used as a source of enhanced resolution blocks 152 for decoding subsequent frames of the sequence of frames 502, and the decoder 102 switches back to the base resolution mode 162 to generate a next frame of the sequence 510. The decoder 102 generates an output sequence of frames 530 that corresponds to the sequence 520 of enhanced resolution frames.

FIG. 6 is a timing diagram 600 of base resolution decoding and enhanced resolution generation at the decoder 102, according to a particular implementation. For example, the decoder 102 is configured to receive the bitstream representation of the sequence of frames 502 of FIG. 5 and to alternate between the base resolution mode 162 and the enhanced resolution mode 164 when generating the decoder output 108.

In a particular implementation, the decoder 102 is configured to, for each particular frame of the sequence 520 and during a single frame decoding time 620, reconstruct a base resolution version of the particular frame (e.g., a base resolution frame 138) and generate an enhanced resolution version of the particular frame (e.g., an enhanced resolution frame 148). As described above with reference to FIG. 5, the decoder 102 is further configured to store the base resolution version of the particular frame and the enhanced resolution version of the particular frame in the decoded picture buffer 118, and to subsequently use the base resolution version of the particular frame from the decoded picture buffer 118 as source blocks for motion transfer in the base resolution mode 162 and to use the enhanced resolution version of the particular frame from the decoded picture buffer 118 as source blocks for motion transfer in the enhanced resolution mode 164.

As illustrated in the timing diagram 600 the decoder 102 is controlled (e.g., via the controller 160), such that, during a first decoding time 620A associated with a first particular frame of the sequence (e.g., F1 in FIG. 5), the prediction engine 114 operates according to the base resolution mode 162 to generate a base resolution version of the first particular frame, illustrated as a base resolution frame 138A (e.g., B1 of FIG. 5). Also during the first decoding time 620A, the prediction engine 114 operates according to the enhanced resolution mode 164 to generate an enhanced resolution version of the first particular frame, illustrated as an enhanced resolution frame 148A (e.g., E1 of FIG. 5).

During a second decoding time 620B that sequentially follows the first decoding time 620A and is associated with a second particular frame (e.g., F2 of FIG. 5) that sequentially follows the first particular frame, the prediction engine 114 operates according to the base resolution mode 162 to generate a base resolution version of the second particular frame, illustrated as a base resolution frame 138B (e.g., B2 of FIG. 5). Also during the second decoding time 620B associated with the second frame, the prediction engine 114 operates according to the enhanced resolution mode 164 to generate an enhanced resolution version of the second particular frame, illustrated as an enhanced resolution frame 148B (e.g., E2 of FIG. 5).

During an Nth decoding time 620N that is associated with an Nth particular frame (e.g., FN of FIG. 5), the prediction engine 114 operates according to the base resolution mode 162 to generate a base resolution version of the Nth particular frame, illustrated as a base resolution frame 138N (e.g., BN of FIG. 5). Also during the Nth decoding time 620N associated with the Nth frame, the prediction engine 114 operates according to the enhanced resolution mode 164 to generate an enhanced resolution version of the Nth particular frame, illustrated as an enhanced resolution frame 148N (e.g., EN of FIG. 5).

Figure 7:
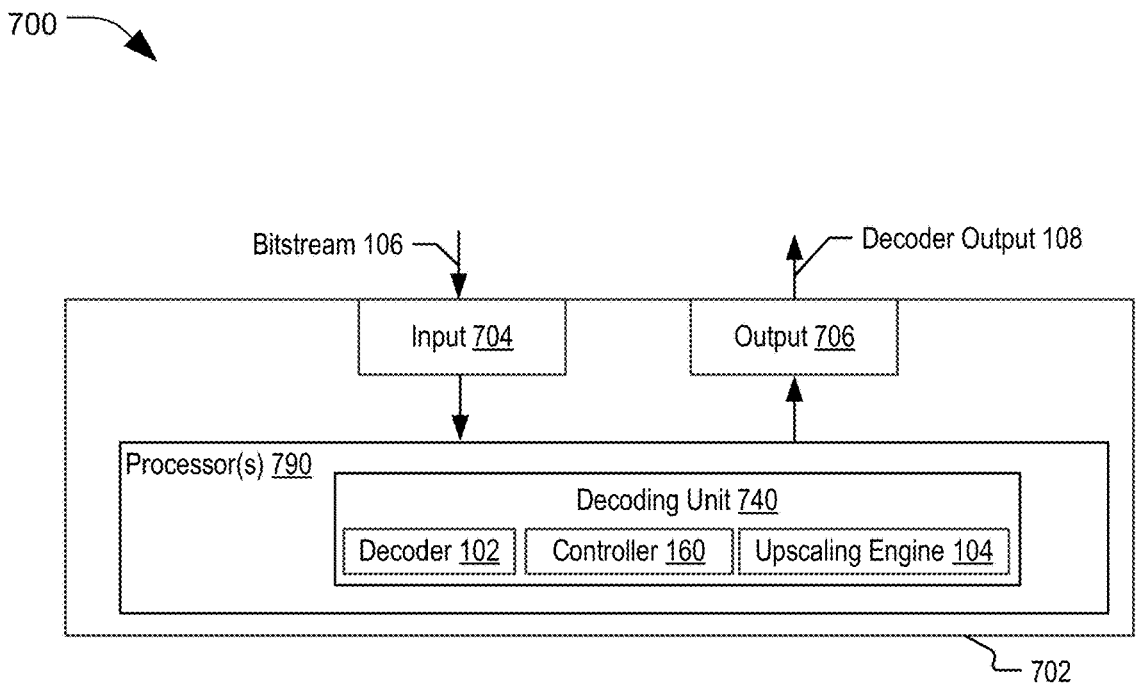
FIG. 7 illustrates an example of an integrated circuit operable to perform enhanced resolution generation at a decoder, in accordance with some examples of the present disclosure.
Figure 11:
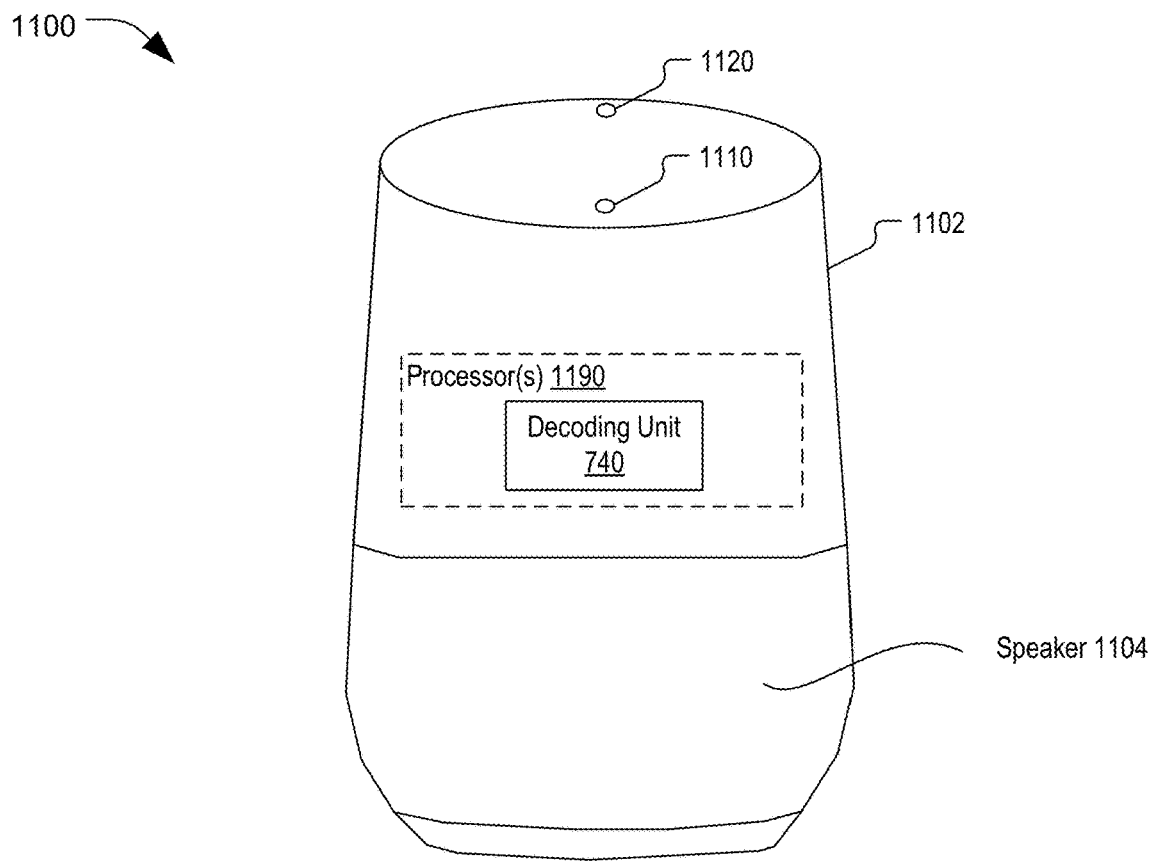
FIG. 11 is a diagram of a voice-controlled speaker system operable to perform enhanced resolution generation at a decoder, in accordance with some examples of the present disclosure.
Figure 12:
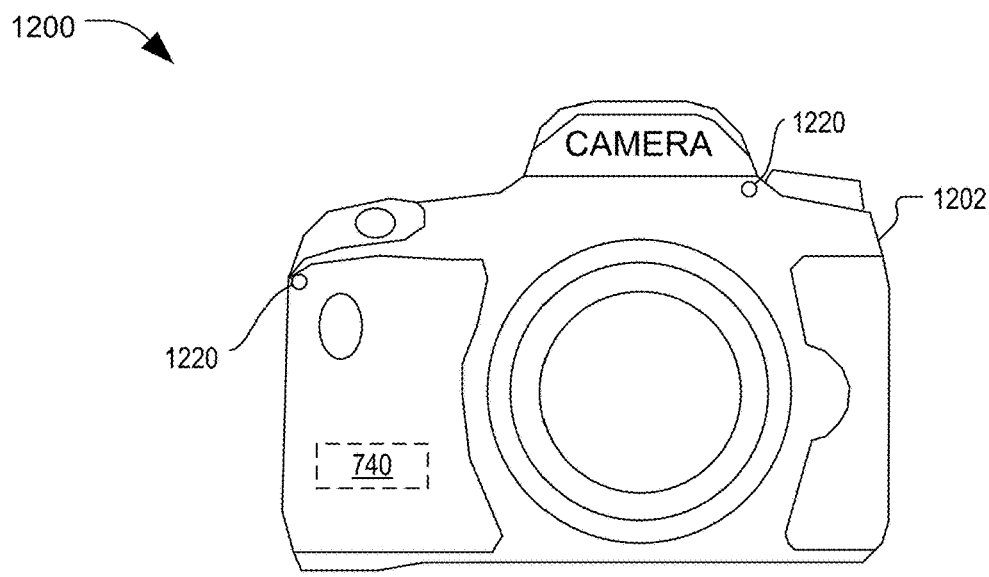
FIG. 12 is a diagram of a camera operable to perform enhanced resolution generation at a decoder, in accordance with some examples of the present disclosure.
Figure 13:
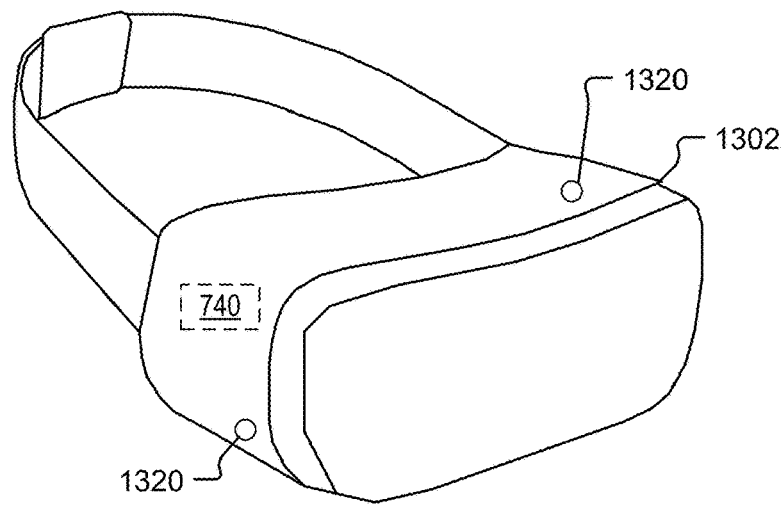
FIG. 13 is a diagram of a headset, such as a virtual reality, mixed reality, or augmented reality headset, operable to perform enhanced resolution generation at a decoder, in accordance with some examples of the present disclosure.
Figure 14:
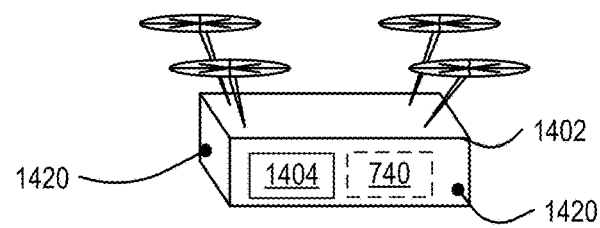
FIG. 14 is a diagram of a first example of a vehicle operable to perform enhanced resolution generation at a decoder, in accordance with some examples of the present disclosure.
Figure 15:
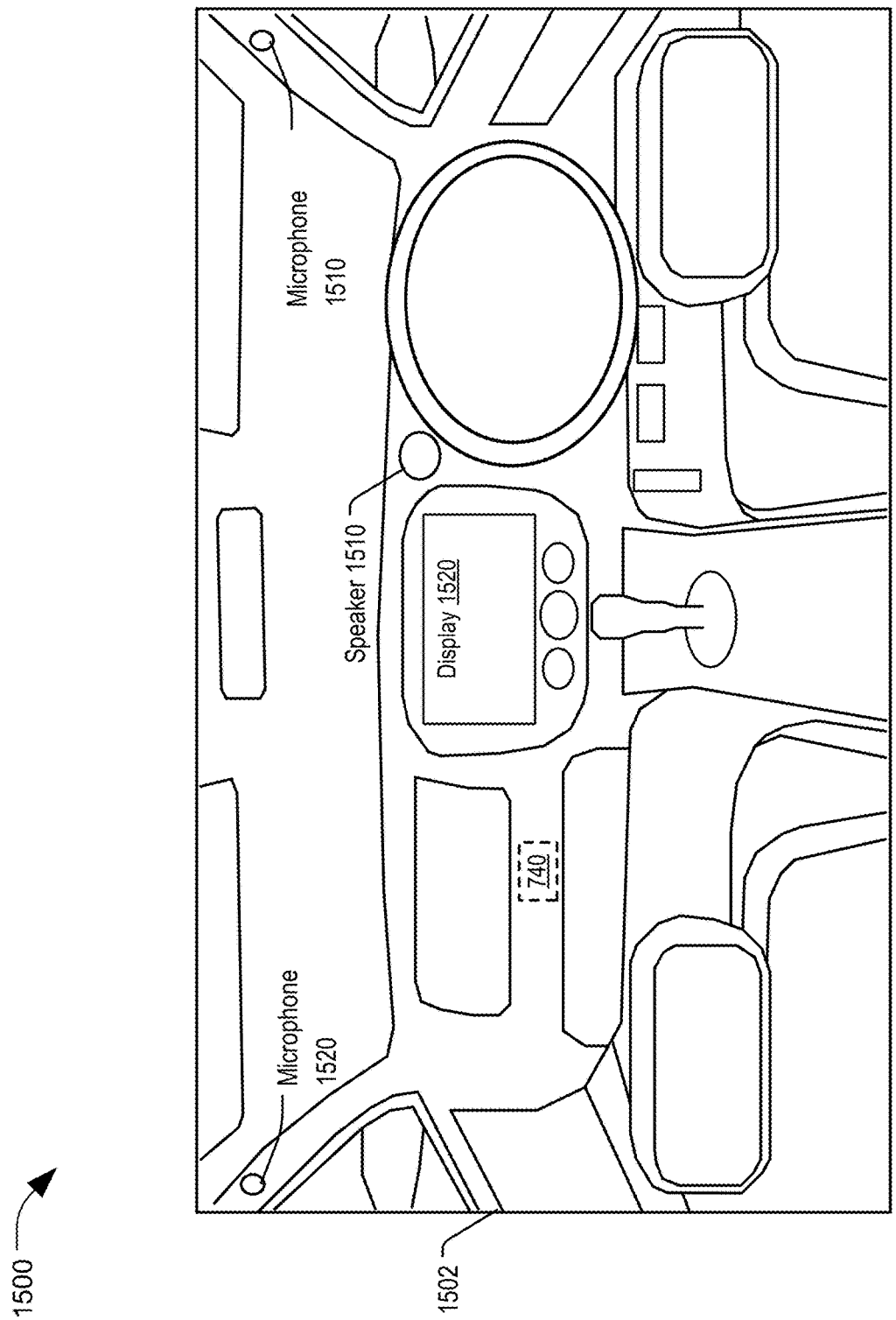
FIG. 15 is a diagram of a second example of a vehicle operable to perform enhanced resolution generation at a decoder, in accordance with some examples of the present disclosure.

FIG. 7 depicts an implementation 700 of the device 101 as an integrated circuit 702 that includes one or more processors 790. The one or more processors 790 include a decoding unit 740. The decoding unit 740 includes the decoder 102, the controller 160, and the upscaling engine 104 of FIG. 1. The integrated circuit 702 also includes an input 704, such as one or more bus interfaces, to enable the bitstream 106 to be received for processing. The integrated circuit 702 also includes an output 706, such as a bus interface, to enable sending of an output signal, such as the decoder output 108. The integrated circuit 702 enables implementation of the device 101 as a component in a system that includes a display and/or other components, such as a mobile phone or tablet as depicted in FIG. 8 a headset as depicted in FIG. 9, a wearable electronic device as depicted in FIG. 10, a voice-controlled speaker system as depicted in FIG. 11, a camera as depicted in FIG. 12, a virtual reality, mixed reality, or augmented reality headset as depicted in FIG. 13, or a vehicle as depicted in FIG. 14 or FIG. 15.

Figure 8:
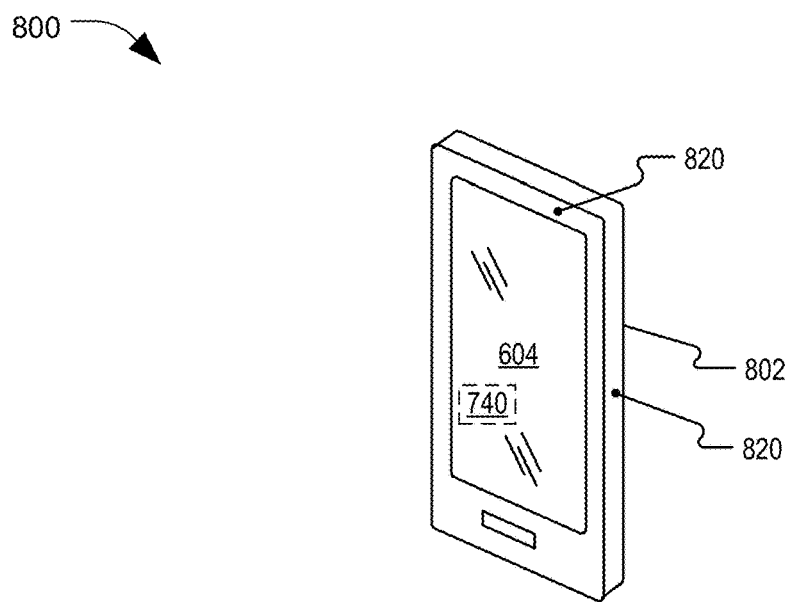
FIG. 8 is a diagram of a mobile device operable to perform enhanced resolution generation at a decoder, in accordance with some examples of the present disclosure.

FIG. 8 depicts an implementation 800 in which the device 101 includes a mobile device 802, such as a phone or tablet, as illustrative, non-limiting examples. The mobile device 802 includes multiple speakers 820 and a display screen 804. In addition, the decoding unit 740 is integrated in the mobile device 802 and is illustrated using dashed lines to indicate internal components that are not generally visible to a user of the mobile device 802. In a particular example, the decoding unit 740 operates to process a video bitstream that may be wirelessly received from another device (e.g., a streaming video source) or may be retrieved from local storage (e.g., a video recording that was captured and saved at the mobile device 802), which is then processed at the decoding unit 740 to generate enhanced resolution video content (e.g., enhanced resolution frames that are generated by the decoder 102) that can be played out at the display screen 804. Audio associated with the enhanced resolution video content can be played out via the speakers 820.

Figure 9:
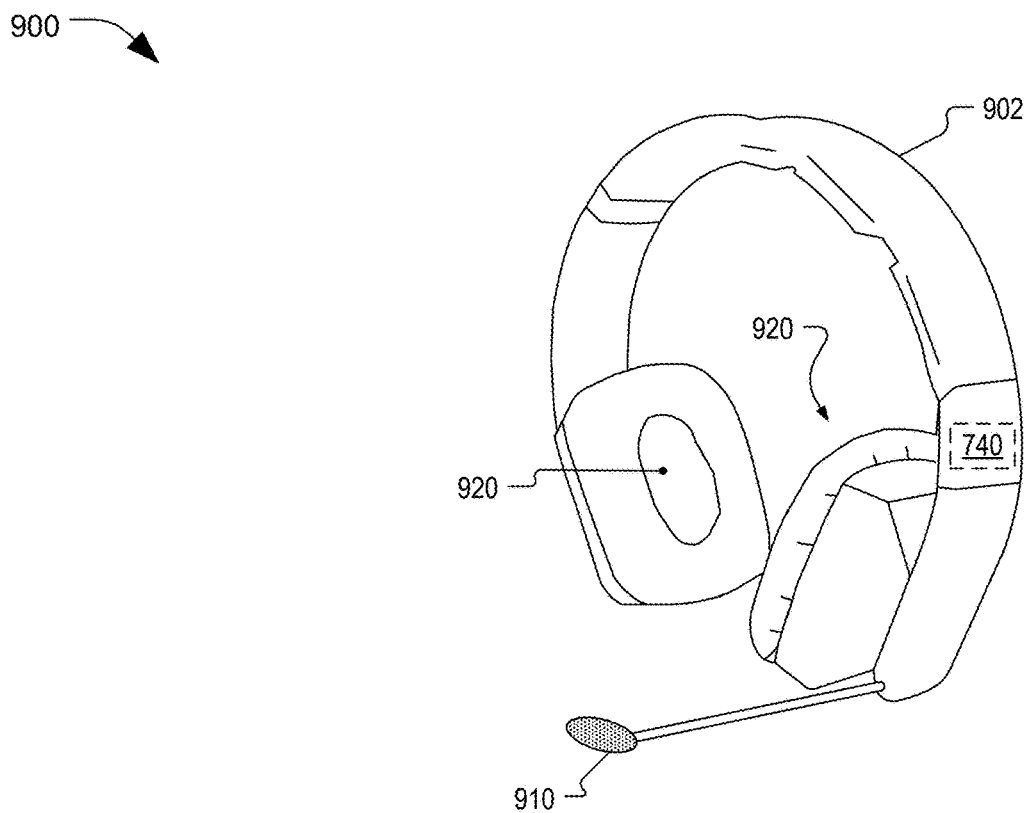
FIG. 9 is a diagram of a headset operable to perform enhanced resolution generation at a decoder, in accordance with some examples of the present disclosure.

FIG. 9 depicts an implementation 900 in which the device 101 includes a headset device 902. The headset device 902 includes a microphone 910 and speakers 920. In addition, the decoding unit 740 is integrated in the headset device 902. In a particular example, the decoding unit 740 operates to process a video bitstream that may be wirelessly received from another device (e.g., a streaming video source) or may be retrieved from local or network storage (e.g., a video recording that was captured and saved at the headset device 902), which is then processed at the decoding unit 740 to generate enhanced resolution video content (e.g., enhanced resolution frames that are generated by the decoder 102). The enhanced resolution video content can be played out at a display screen (not shown) that is integrated with or coupled to the headset device 902. Additionally, audio associated with the enhanced resolution video content can be played out via the speakers 920.

Figure 10:
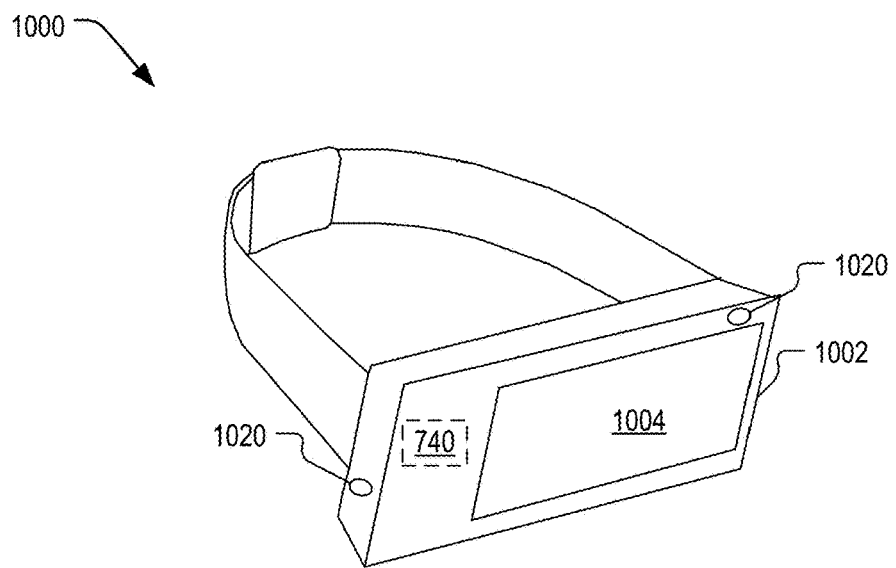
FIG. 10 is a diagram of a wearable electronic device operable to perform enhanced resolution generation at a decoder, in accordance with some examples of the present disclosure.

FIG. 10 depicts an implementation 1000 in which the device 101 includes a wearable electronic device 1002, illustrated as a "smart watch." The decoding unit 740, speakers 1020, and a display screen 1004 are integrated into the wearable electronic device 1002. In a particular example, the decoding unit 740 operates to process a video bitstream that may be wirelessly received from another device (e.g., a streaming video source) or may be retrieved from local or network storage, such as a video recording that was captured and saved at the wearable electronic device 1002. The video bitstream may be processed at the decoding unit 740 to generate enhanced resolution video content (e.g., enhanced resolution frames that are generated by the decoder 102) that can be played out at the display screen 1004. Additionally, audio associated with the enhanced resolution video content can be played out via the speakers 1020.

In a particular example, the wearable electronic device 1002 includes a haptic device that provides a haptic notification (e.g., vibrates) in response to detection of activity regarding video decoding and playback. For example, the haptic notification can cause a user to look at the wearable electronic device 1002 to see a displayed notification indicating that a change of resolution for the video playback is suggested, such as from enhanced resolution to base resolution in response to detecting a low battery condition at the wearable electronic device 1002, or from base resolution to enhanced resolution in response to determining that the battery of the wearable electronic device 1002 is charging. The wearable electronic device 1002 can thus alert a user with a hearing impairment or a user wearing a headset of such notifications.

FIG. 11 is an implementation 1100 in which the device 101 includes a wireless speaker and voice activated device 1102. The wireless speaker and voice activated device 1102 can have wireless network connectivity and is configured to execute an assistant operation. One or more processors 1190 including the decoding unit 740, a first microphone 1110, a second microphone 1120, a speaker 1104, or a combination thereof, are included in the wireless speaker and voice activated device 1102. In a particular example, the decoding unit 740 operates to process a video bitstream that may be wirelessly received from another device (e.g., a streaming video source) or may be retrieved from local or network storage, such as a video recording that was captured and saved at the wireless speaker and voice activated device 1102. The video bitstream may be processed at the decoding unit 740 to generate enhanced resolution video content (e.g., enhanced resolution frames that are generated by the decoder 102) that can be played out at a display screen (not shown) that is integrated with or coupled to the wireless speaker and voice activated device 1102. Additionally, audio associated with the enhanced resolution video content can be played out via the speaker 1104.

During operation, in response to receiving a verbal command from a user via the microphones 1110, 1120, the wireless speaker and voice activated device 1102 can execute assistant operations, such as via execution of a voice activation system (e.g., an integrated assistant application). The assistant operations can include adjusting a temperature, playing music, turning on lights, etc. For example, the assistant operations can include initiating video playback at the decoding unit 740.

FIG. 12 depicts an implementation 1200 in which the device 101 includes a portable electronic device that corresponds to a camera device 1202. The decoding unit 740, speakers 1220, or a combination thereof, are included in the camera device 1202. In a particular example, the decoding unit 740 operates to process a video bitstream that may be wirelessly received from another device (e.g., a streaming video source) or may be retrieved from local or network storage, such as a video recording that was captured and saved at the camera device 1202. The video bitstream may be processed at the decoding unit 740 to generate enhanced resolution video content (e.g., enhanced resolution frames that are generated by the decoder 102) that can be played out at a display screen (not shown) that is integrated with or coupled to the camera device 1202. Additionally, audio associated with the enhanced resolution video content can be played out via the speakers 1220.

FIG. 13 depicts an implementation 1300 in which the device 101 includes a portable electronic device that corresponds to a virtual reality, mixed reality, or augmented reality headset 1302. The decoding unit 740 and speakers 1320 are integrated into the headset 1302. A visual interface device, such as a display screen, is positioned in front of the user's eyes to enable display of augmented reality, mixed reality, or virtual reality images or scenes to the user while the headset 1302 is worn. In a particular example, the decoding unit 740 operates to process a video bitstream that may be wirelessly received from another device (e.g., a streaming video source) or may be retrieved from local or network storage, such as a video recording. The video bitstream may be processed at the decoding unit 740 to generate enhanced resolution video content (e.g., enhanced resolution frames that are generated by the decoder 102) that can be played out at the visual interface device. Additionally, audio associated with the enhanced resolution video content can be played out via the speakers 1320, such as transducers of one or more earphones coupled to or integrated with the headset 1302.

FIG. 14 depicts an implementation 1400 in which the device 101 corresponds to, or is integrated within, a vehicle 1402, illustrated as a manned or unmanned aerial device (e.g., a package delivery drone). The decoding unit 740, speakers 1420, a display device 1404, or a combination thereof, are integrated into the vehicle 1402. In a particular example, the decoding unit 740 operates to process a video bitstream that may be wirelessly received from another device (e.g., a streaming video source) or may be retrieved from local or network storage, such as a video recording. The video bitstream may be processed at the decoding unit 740 to generate enhanced resolution video content (e.g., enhanced resolution frames that are generated by the decoder 102) that can be played out at the display device 1404. Additionally, audio associated with the enhanced resolution video content can be played out via the speakers 1420. For example, the video content may include unboxing or other instructions that can be played out to a recipient of a package delivered by the vehicle 1402.

FIG. 15 depicts another implementation 1500 in which the device 101 corresponds to, or is integrated within, a vehicle 1502, illustrated as a car. The decoding unit 740, one or more speakers 1510, a display device 1520, or a combination thereof, are integrated into the vehicle 1502. In a particular example, the decoding unit 740 operates to process a video bitstream that may be wirelessly received from another device (e.g., a streaming video source) or may be retrieved from local or network storage, such as a video recording. The video bitstream may be processed at the decoding unit 740 to generate enhanced resolution video content (e.g., enhanced resolution frames that are generated by the decoder 102) that can be played out at the display device 1520. Additionally, audio associated with the enhanced resolution video content can be played out via the one or more speakers 1510. In some implementations, the decoding unit 740 is included in a vehicle entertainment system and may be configured to provide video content at one or more display screens for various occupants of the vehicle 1502.

Figure 16:
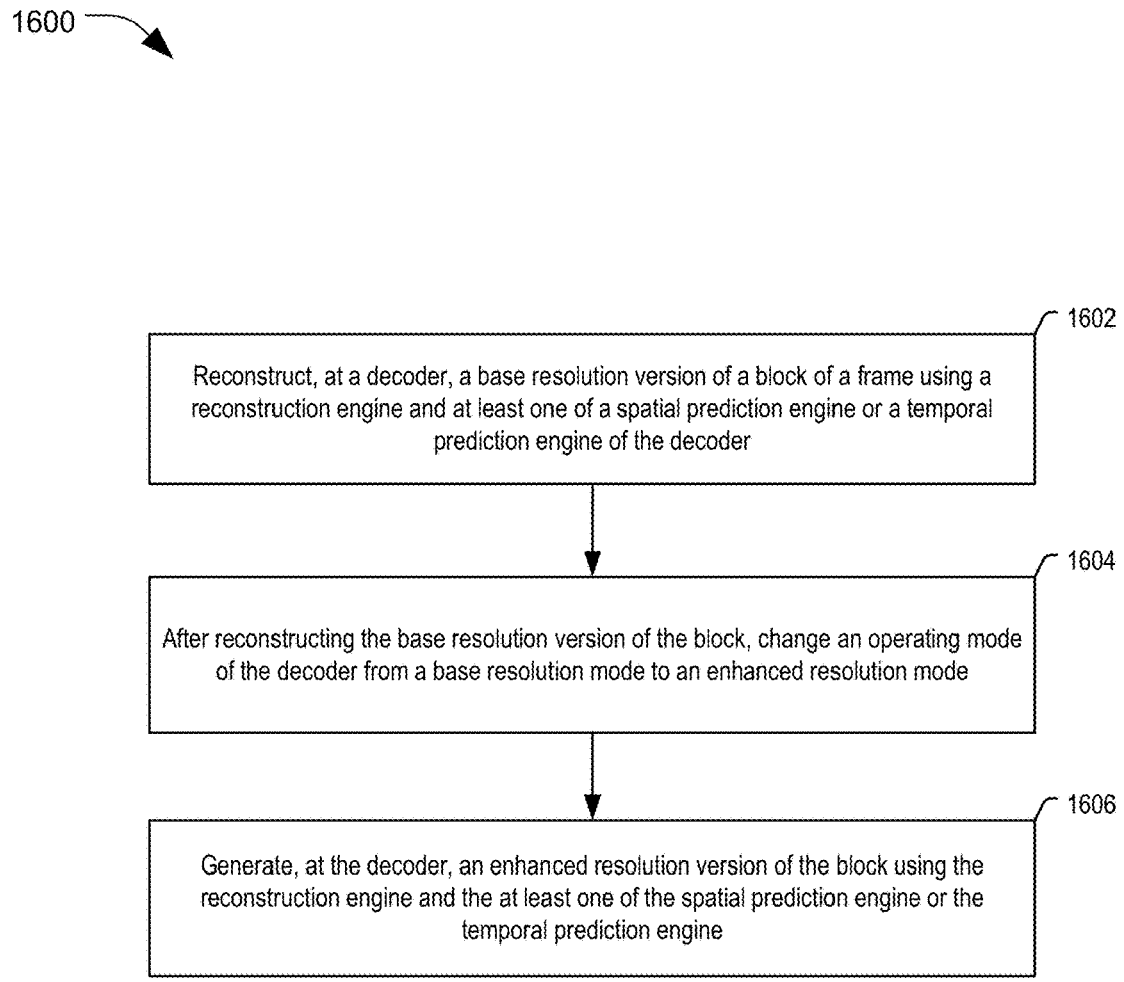
FIG. 16 is a diagram of a particular implementation of a method of performing enhanced resolution generation that may be performed by the system of FIG. 1, in accordance with some examples of the present disclosure.

FIG. 16 is a diagram of a particular implementation of a method of performing enhanced resolution generation. In a particular aspect, one or more operations of the method 1600 are performed by at least one of the decoder 102, the controller 160, the upscaling engine 104, the device 101, the system 100 of FIG. 1, or a combination thereof.

The method 1600 includes reconstructing, at a decoder, a base resolution version of a block of a frame using a reconstruction engine and at least one of a spatial prediction engine or a temporal prediction engine of the decoder, at 1602. For example, the prediction engine 114 of the decoder 102 generates the reconstructed base resolution block 274A using the reconstruction engine 208 and at least one of the temporal prediction engine 202 or the spatial prediction engine 204.

The method 1600 includes, after reconstructing the base resolution version of the block, changing an operating mode of the decoder from a base resolution mode to an enhanced resolution mode, at 1604. For example, the controller 160 causes the decoder 102 to switch from operating in the base resolution mode 162 to operating in the enhanced resolution mode 164. According to an aspect, switching between the operating in the base resolution mode 162 and operating in the enhanced resolution mode 164 is performed after reconstruction of all blocks of the current frame is completed, such as described with reference to FIG. 5 and FIG. 6.

The method 1600 also includes, after reconstructing the base resolution version of the block, generating, at the decoder, an enhanced resolution version of the block using the reconstruction engine and the at least one of the spatial prediction engine or the temporal prediction engine, at 1606. For example, the prediction engine 114 of the decoder 102 generates the reconstructed enhanced resolution block 274B using the reconstruction engine 208 and the same one of the temporal prediction engine 202 or the spatial prediction engine 204 that was used for generating the reconstructed base resolution block 274A.

In some implementations, the method 1600 includes generating a bypass control signal based on a comparison of an energy metric of a residual of the block to a dynamic threshold. The dynamic threshold is based on a decay factor and a transfer distance from a most recently generated enhanced resolution key frame. For example, the adaptive transfer logic 230 generates the flag 246 based on a comparison of the energy metric 248 to the dynamic threshold 232. As explained earlier, the dynamic threshold 232 can be determined as $THR_{bypass}*\beta^i$, where $\beta$ represents a decay factor and i represents a transfer distance from a most recent key frame. The method 1600 can also include bypassing operation of one or more of an upscaler, the temporal prediction engine, the spatial prediction engine, or the reconstruction engine based on the bypass control signal. For example, one or more of the upscaler 220A, the upscaler 220B, the temporal prediction engine 202, the spatial prediction engine 204, or the reconstruction engine 208 may be bypassed or deactivated based on the value of the flag 246.

In some implementations, the method 1600 includes offloading upscaling of key frames to an upscaling engine to generate enhanced resolution versions of the key frames. For example, the base resolution key frame 120 is offloaded to the upscaling engine 104 to generate the enhanced resolution key frame 122. In some implementations, after generating an enhanced resolution version of a key frame, enhanced resolution versions of one or more subsequent frames may be generated by the decoder operating in the enhanced resolution mode based on blocks of the enhanced resolution version of the key frame. To illustrate, the enhanced resolution key frame 122 can be stored as an enhanced resolution frame 148 in the decoded picture buffer 118 to be available as a reference frame for generation of subsequent enhanced resolution frames.

The method 1600 thus enables thus enables generation of enhanced resolution frames using the same components of the decoder 102 and information from the bitstream that are used to generate the base resolution reconstruction of the frame, which provides the technical advantage of reduced power consumption and reducing the amount of processing resources required to generate enhanced resolution frames as compared to using the upscaling engine 104 to upscale every frame. Using the same components of decoder 102 for decoding base resolution frames and generating enhanced resolution frames also provides the technical benefit of reducing the number of components, size, and data transfer bandwidth as compared to implementations in which the bitstream data and base resolution frames are transferred from the decoder 102 to another set of components for generation of the enhanced resolution frames.

The method 1600 of FIG. 16 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1600 of FIG. 16 may be performed by a processor that executes instructions, such as described with reference to FIG. 16.

Referring to FIG. 17, a block diagram of a particular illustrative implementation of a device is depicted and generally designated 1700. In various implementations, the device 1700 may have more or fewer components than illustrated in FIG. 17. In an illustrative implementation, the device 1700 may correspond to the device 101. In an illustrative implementation, the device 1700 may perform one or more operations described with reference to FIGS. 1-16.

In a particular implementation, the device 1700 includes a processor 1706 (e.g., a central processing unit (CPU)). The device 1700 may include one or more additional processors 1710 (e.g., one or more DSPs). The processors 1710 may include a speech and music coder-decoder (CODEC) 1708 that includes a voice coder ("vocoder") encoder 1736, a vocoder decoder 1738, the decoding unit 740, or a combination thereof.

The device 1700 may include a memory 1786 and a CODEC 1734. The memory 1786 may include instructions 1756, that are executable by the one or more additional processors 1710 (or the processor 1706) to implement the functionality described with reference to the decoding unit 740, or both. The device 1700 may include a modem 1748 coupled, via a transceiver 1750, to an antenna 1752. Encoded video data, such as the bitstream 106, may be received from a remote video source device 1790 via a wireless transmission 1796 received at the antenna 1752, which may further be processed by the decoding unit 740 for playout of enhanced resolution video at a display 1728.

The device 1700 may include the display 1728 coupled to a display controller 1726. A speaker 1792 and a microphone 1794 may be coupled to the CODEC 1734. The CODEC 1734 may include a digital-to-analog converter (DAC) 1702, an analog-to-digital converter (ADC) 1704, or both. In a particular implementation, the CODEC 1734 may receive analog signals from the microphone 1794, convert the analog signals to digital signals using the analog-to-digital converter 1704, and provide the digital signals to the speech and music codec 1708. The speech and music codec 1708 may process the digital signals. In a particular implementation, the speech and music codec 1708 may provide digital signals to the CODEC 1734. The CODEC 1734 may convert the digital signals to analog signals using the digital-to-analog converter 1702 and may provide the analog signals to the speaker 1792.

In a particular implementation, the device 1700 may be included in a system-in-package or system-on-chip device 1722. In a particular implementation, the memory 1786, the processor 1706, the processors 1710, the display controller 1726, the CODEC 1734, and the modem 1748 are included in the system-in-package or system-on-chip device 1722. In a particular implementation, an input device 1730 and a power supply 1744 are coupled to the system-in-package or the system-on-chip device 1722. Moreover, in a particular implementation, as illustrated in FIG. 17, the display 1728, the input device 1730, the speaker 1792, the microphone 1794, the antenna 1752, and the power supply 1744 are external to the system-in-package or the system-on-chip device 1722. In a particular implementation, each of the display 1728, the input device 1730, the speaker 1792, the microphone 1794, the antenna 1752, and the power supply 1744 may be coupled to a component of the system-in-package or the system-on-chip device 1722, such as an interface or a controller.

The device 1700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for decoding including reconstructing, in a base resolution mode, a base resolution version of a block of a frame using a reconstruction engine and at least one of a spatial prediction engine or a temporal prediction engine and generating, in an enhanced resolution mode, an enhanced resolution version of the block using the reconstruction engine and the at least one of the spatial prediction engine or the temporal prediction engine. For example, the means for reconstructing the base resolution version of the block and for generating the enhanced resolution version of the block can correspond to the syntax engine 110, the transform engine 112, the prediction engine 114, the filter engine 116, the decoded picture buffer 118, the decoder 102, the upscalers 220, the temporal prediction engine 202, the spatial prediction engine 204, the selector 206, the reconstruction engine 208, selector 210, the decoding unit 740, the one or more processors 790, the processor 1706, the one or more processors 1710, one or more other circuits or components configured to perform decoding including reconstructing, in a base resolution mode, a base resolution version of a block of a frame using a reconstruction engine and at least one of a spatial prediction engine or a temporal prediction engine and generate, in an enhanced resolution mode, an enhanced resolution version of the block using the reconstruction engine and the at least one of the spatial prediction engine or the temporal prediction engine, or any combination thereof.

The apparatus also includes means for means for controlling an operating mode of the means for decoding. For example, the means for controlling an operating mode of the means for decoding can correspond to the controller 160, the device 101, the decoding unit 740, the one or more processors 790, the processor 1706, the one or more processors 1710, one or more other circuits or components configured to control an operating mode of the means for decoding, or any combination thereof.

In some implementations, a non-transitory computer-readable medium (e.g., a computer-readable storage device, such as the memory 1786) includes instructions (e.g., the instructions 1756) that, when executed by one or more processors (e.g., the one or more processors 1710 or the processor 1706), cause the one or more processors to reconstruct, at a decoder (e.g., the decoder 102), a base resolution version of a block of a frame using a reconstruction engine (e.g., the reconstruction engine 208) and at least one of a spatial prediction engine (e.g., the spatial prediction engine 204 or the temporal prediction engine 202) of the decoder; and after reconstructing the base resolution version of the block: change an operating mode of the decoder from a base resolution mode (e.g., the base resolution mode 162 to an enhanced resolution mode (e.g., the enhanced resolution mode 164); and generate, at the decoder, an enhanced resolution version of the block using the reconstruction engine and the at least one of the spatial prediction engine or the temporal prediction engine.

Particular aspects of the disclosure are described below in sets of interrelated Examples:

According to Example 1, a device includes a decoder that includes a spatial prediction engine, a temporal prediction engine, a reconstruction engine, and a decoded picture buffer; and a controller configured to cause the decoder to: in a base resolution mode, reconstruct a base resolution version of a block of a frame using the reconstruction engine and at least one of the spatial prediction engine or the temporal prediction engine; and in an enhanced resolution mode, generate an enhanced resolution version of the block using the reconstruction engine and the at least one of the spatial prediction engine or the temporal prediction engine.

Example 2 includes the device of Example 1, wherein the decoder, based on receiving an inter-prediction indicator for the block, is configured to: in the base resolution mode: generate, at the temporal prediction engine, a base resolution prediction of the block using a motion vector to copy pixels of a base resolution version of a reference frame from the decoded picture buffer; and generate, at the reconstruction engine, a base resolution reconstruction of the block based on the base resolution prediction and a residual for the block; and in the enhanced resolution mode: upscale the motion vector to generate an upscaled motion vector; upscale the residual to generate an upscaled residual; generate, at the temporal prediction engine, an enhanced resolution prediction of the block using the upscaled motion vector to copy pixels of an enhanced resolution version of the reference frame from the decoded picture buffer; and generate, at the reconstruction engine, an enhanced resolution reconstruction of the block based on the enhanced resolution prediction and the upscaled residual.

Example 3 includes the device of Example 1 or Example 2, wherein the decoder is configured to generate a bypass control signal based on a comparison of an energy metric of a residual of the block to a dynamic threshold, wherein the dynamic threshold is based on a decay factor and a transfer distance from a most recently generated enhanced resolution key frame.

Example 4 includes the device of Example 3, wherein the spatial prediction engine, the temporal prediction engine, and the reconstruction engine are included in a prediction engine of the decoder, and wherein in the enhanced resolution mode the decoder is further configured, based on the bypass control signal, to select one of an output of the reconstruction engine or an upscaled version of the base resolution version of the block as an output of the prediction engine.

Example 5 includes the device of Example 3 or Example 4, wherein the decoder is configured to bypass operation of one or more of an upscaler, the temporal prediction engine, the spatial prediction engine, or the reconstruction engine based on the bypass control signal.

Example 6 includes the device of any of Examples 1 to 5 and further includes an upscaling engine coupled to the decoder, wherein the decoder is configured to offload upscaling of key frames to the upscaling engine to generate enhanced resolution versions of the key frames.

Example 7 includes the device of any of Example 6, wherein the upscaling engine includes a machine learning model.

Example 8 includes the device of Example 6 or Example 7 wherein, after generating an enhanced resolution version of a key frame, enhanced resolution versions of one or more subsequent frames are generated by the decoder in the enhanced resolution mode based on blocks of the enhanced resolution version of the key frame.

Example 9 includes the device of any of Examples 1 to 8, wherein the decoder further includes an upscaler configured to generate an upscaled residual of the block, and wherein the reconstruction engine is configured to use the upscaled residual during generation of the enhanced resolution version of the block.

Example 10 includes the device of any of Examples 1 to 9, wherein the decoder is configured to receive a motion vector of the block via a bitstream and to upscale the motion vector in the enhanced resolution mode.

Example 11 includes the device of Example 10, wherein the decoder is configured to transfer enhanced resolution pixels based on the upscaled motion vector.

Example 12 includes the device of any of Examples 1 to 11, wherein the decoder is configured to: receive a bitstream representation of a sequence of frames; and for each particular frame of the sequence and during a single frame decoding time, reconstruct a base resolution version of the particular frame and generate an enhanced resolution version of the particular frame.

Example 13 includes the device of Example 12, wherein the decoder is further configured to store the base resolution version of the particular frame and the enhanced resolution version of the particular frame in the decoded picture buffer.

Example 14 includes the device of Example 13, wherein the decoder is configured to use the enhanced resolution version of the particular frame from the decoded picture buffer as source blocks for motion transfer in the enhanced resolution mode.

Example 15 includes the device of Example 12 to 14, wherein the spatial prediction engine, the temporal prediction engine, and the reconstruction engine are included in a prediction engine of the decoder, and wherein the controller is configured to cause the decoder to: during a first decoding time associated with a first particular frame of the sequence: operate the prediction engine according to the base resolution mode to generate a base resolution version of the first particular frame; and operate the prediction engine according to the enhanced resolution mode to generate an enhanced resolution version of the first particular frame; and during a second decoding time that sequentially follows the first decoding time and is associated with a second particular frame that sequentially follows the first particular frame: operate the prediction engine according to the base resolution mode to generate a base resolution version of the second particular frame; and operate the prediction engine according to the enhanced resolution mode to generate an enhanced resolution version of the second particular frame.

Example 16 includes the device of any of Examples 1 to 15 and further includes a display device configured to play out an enhanced resolution version of frames generated by the decoder.

Example 17 includes the device of Example 16 and further includes one or more speakers configured to play out audio associated with the frames.

Example 18 includes the device of any of Examples 1 to 17 and further includes a modem configured to receive a sequence of frames via a bitstream from an encoder device.

Example 19 includes the device of any of Examples 1 to 18, wherein the decoder and the controller are included in an integrated circuit.

Example 20 includes the device of any of Examples 1 to 19, wherein the decoder and the controller are integrated in a headset device.

Example 21 includes the device of Example 20, wherein the headset device corresponds to at least one of a virtual reality headset, a mixed reality headset, or an augmented reality headset.

Example 22 includes the device of any of Examples 1 to 19, wherein the decoder and the controller are integrated in at least one of a mobile phone, a tablet computer device, or a wearable electronic device.

Example 23 includes the device of any of Examples 1 to 19, wherein the decoder and the controller are integrated in a vehicle.

According to Example 24, a method includes reconstructing, at a decoder, a base resolution version of a block of a frame using a reconstruction engine and at least one of a spatial prediction engine or a temporal prediction engine of the decoder; and after reconstructing the base resolution version of the block: changing an operating mode of the decoder from a base resolution mode to an enhanced resolution mode; and generating, at the decoder, an enhanced resolution version of the block using the reconstruction engine and the at least one of the spatial prediction engine or the temporal prediction engine.

Example 25 includes the method of Example 24, further comprising, based on receiving an inter-prediction indicator for the block: while the operating mode of the decoder is the base resolution mode: generating, at the temporal prediction engine, a base resolution prediction of the block using a motion vector to copy pixels of a base resolution version of a reference frame from the decoded picture buffer; and generating, at the reconstruction engine, a base resolution reconstruction of the block based on the base resolution prediction and a residual for the block; and while the operating mode of the decoder is the enhanced resolution mode: upscaling the motion vector to generate an upscaled motion vector; upscaling the residual to generate an upscaled residual; generating, at the temporal prediction engine, an enhanced resolution prediction of the block using the upscaled motion vector to copy pixels of an enhanced resolution version of the reference frame from the decoded picture buffer; and generating, at the reconstruction engine, an enhanced resolution reconstruction of the block based on the enhanced resolution prediction and the upscaled residual.

Example 26 includes the method of Example 24 or Example 25, further comprising generating a bypass control signal based on a comparison of an energy metric of a residual of the block to a dynamic threshold, wherein the dynamic threshold is based on a decay factor and a transfer distance from a most recently generated enhanced resolution key frame.

Example 27 includes the method of Example 26, wherein the spatial prediction engine, the temporal prediction engine, and the reconstruction engine are included in a prediction engine of the decoder, the method further includes selecting, based on the bypass control signal, one of an output of the reconstruction engine or an upscaled version of the base resolution version of the block as an output of the prediction engine.

Example 28 includes the method of Example 26 or Example 27 and further includes bypassing operation of one or more of an upscaler, the temporal prediction engine, the spatial prediction engine, or the reconstruction engine based on the bypass control signal.

Example 29 includes the method of any of Examples 24 to 28 and further includes offloading upscaling of key frames to an upscaling engine to generate enhanced resolution versions of the key frames.

Example 30 includes the method of Example 29, wherein the upscaling engine includes a machine learning model.

Example 31 includes the method of Example 28 or Example 29 wherein, after generating an enhanced resolution version of a key frame, enhanced resolution versions of one or more subsequent frames are generated by the decoder operating in the enhanced resolution mode based on blocks of the enhanced resolution version of the key frame.

Example 32 includes the method of any of Examples 24 to 31, further includes generating an upscaled residual of the block; and using the upscaled residual at the reconstruction engine during generation of the enhanced resolution version of the block.

Example 33 includes the method of any of Examples 24 to 32, further includes receiving, at the decoder, a motion vector of the block via a bitstream; and upscaling the motion vector by the decoder operating in the enhanced resolution mode.

Example 34 includes the method of Example 33 and further includes transferring enhanced resolution pixels based on the upscaled motion vector.

Example 35 includes the method of any of Examples 24 to 34, further includes receiving a bitstream representation of a sequence of frames; and for each particular frame of the sequence and during a single frame decoding time: reconstructing a base resolution version of the particular frame; and generating an enhanced resolution version of the particular frame.

Example 36 includes the method of Example 35 and further includes storing the base resolution version of the particular frame and the enhanced resolution version of the particular frame in the decoded picture buffer.

Example 37 includes the method of Example 36 and further includes using, by the decoder operating in the enhanced resolution mode, the enhanced resolution version of the particular frame from the decoded picture buffer as source blocks for motion transfer.

Example 38 includes the method of any of Examples 35 to 37, wherein the spatial prediction engine, the temporal prediction engine, and the reconstruction engine are included in a prediction engine of the decoder, and the method further includes during a first decoding time associated with a first particular frame of the sequence: operating the prediction engine according to the base resolution mode to generate a base resolution version of the first particular frame; and operating the prediction engine according to the enhanced resolution mode to generate an enhanced resolution version of the first particular frame; and during a second decoding time that sequentially follows the first decoding time and is associated with a second particular frame that sequentially follows the first particular frame: operating the prediction engine according to the base resolution mode to generate a base resolution version of the second particular frame; and operating the prediction engine according to the enhanced resolution mode to generate an enhanced resolution version of the second particular frame.

Example 39 includes the method of any of Examples 24 to 38 and further includes playing out, at a display device, an enhanced resolution version of frames generated by the decoder.

Example 40 includes the method of Example 39 and further includes playing out audio associated with the frames at one or more speakers.

Example 41 includes the method of any of Examples 24 to 40 and further includes receiving, at a modem, a sequence of frames via a bitstream from an encoder device.

Example 42 includes the method of any of Examples 24 to 41, wherein the decoder is included in an integrated circuit.

Example 43 includes the method of any of Examples 24 to 42, wherein the decoder is integrated in a headset device.

Example 44 includes the method of Example 43, wherein the headset device corresponds to at least one of a virtual reality headset, a mixed reality headset, or an augmented reality headset.

Example 45 includes the method of any of Examples 24 to 42, wherein the decoder is integrated in at least one of a mobile phone, a tablet computer device, or a wearable electronic device.

Example 46 includes the method of any of Examples 24 to 42, wherein the decoder is integrated in a vehicle.

According to Example 47, a device includes a memory configured to store instructions; and a processor configured to execute the instructions to perform the method of any of Example 24 to Example 46.

According to Example 48, a non-transitory computer readable medium comprising instructions that, when executed by a processor, cause the processor to perform the method of any of Example 24 to Example 46.

According to Example 49, an apparatus comprising means for carrying out the method of any of Example 24 to Example 46.

According to Example 50, a non-transitory computer readable medium comprises instructions that, when executed by one or more processors, cause the one or more processors to: reconstruct, at a decoder, a base resolution version of a block of a frame using a reconstruction engine and at least one of a spatial prediction engine or a temporal prediction engine of the decoder; and after reconstructing the base resolution version of the block: change an operating mode of the decoder from a base resolution mode to an enhanced resolution mode; and generate, at the decoder, an enhanced resolution version of the block using the reconstruction engine and the at least one of the spatial prediction engine or the temporal prediction engine.

According to Example 51, an apparatus includes means for decoding including reconstructing, in a base resolution mode, a base resolution version of a block of a frame using a reconstruction engine and at least one of a spatial prediction engine or a temporal prediction engine and generating, in an enhanced resolution mode, an enhanced resolution version of the block using the reconstruction engine and the at least one of the spatial prediction engine or the temporal prediction engine; and means for controlling an operating mode of the means for decoding.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a decoder, that includes a spatial prediction engine, a temporal prediction engine, a reconstruction engine, and a decoded picture buffer, wherein the decoder is configured to:
offload upscale of a key frame to an upscaling engine that is outside of the decoder; and
generate a bypass control signal that indicates whether to offload upscale of a block of a frame to the upscaling engine or to generate an enhanced resolution version of the block using the reconstruction engine and at least one of the spatial prediction engine or the temporal prediction engine;
a controller configured to cause the decoder to, in a base resolution mode, reconstruct a base resolution version of the block using the reconstruction engine and at least one of the spatial prediction engine or the temporal prediction engine; and
the upscaling engine, coupled to the decoder, configured to perform upscaling to the base resolution version of the key frame to enable the decoder to generate, in an enhanced resolution mode, based on the bypass control signal, an enhanced resolution version of the block.

2. The device of claim 1, wherein the decoder, based on receiving an inter-prediction indicator for the block, is configured to:
in the base resolution mode:
generate, at the temporal prediction engine, a base resolution prediction of the block using a motion vector to copy pixels of a base resolution version of a reference frame from the decoded picture buffer; and
generate, at the reconstruction engine, a base resolution reconstruction of the block based on the base resolution prediction and a residual for the block; and
in the enhanced resolution mode:
upscale the motion vector to generate an upscaled motion vector; and
upscale the residual to generate an upscaled residual;
generate, at the temporal prediction engine, an enhanced resolution prediction of the block using the upscaled motion vector to copy pixels of an enhanced resolution version of the reference frame from the decoded picture buffer; and
generate, at the reconstruction engine, an enhanced resolution reconstruction of the block based on the enhanced resolution prediction and the upscaled residual.

3. The device of claim 1, wherein the bypass control signal is based on a comparison of an energy metric of a residual of the block to a dynamic threshold, wherein the dynamic threshold is based on a decay factor and a transfer distance from an enhanced resolution version of the key frame.

4. The device of claim 1, wherein the spatial prediction engine, the temporal prediction engine, and the reconstruction engine are included in a prediction engine of the decoder, and wherein in the enhanced resolution mode the decoder is configured, based on the bypass control signal, to select one of an output of the reconstruction engine or an upscaled version of the base resolution version of the block as an output of the prediction engine.

5. The device of claim 1, wherein the decoder is configured to bypass operation of one or more of an upscaler, the temporal prediction engine, the spatial prediction engine, or the reconstruction engine based on the bypass control signal.

6. The device of claim 1, wherein the upscaling engine includes a machine learning model that was trained to generate the enhanced resolution version of the key frame.

7. The device of claim 6, wherein the upscaling engine is included in a neural processing unit (NPU).

8. The device of claim 1, wherein, after receipt of the enhanced resolution version of the key frame from the upscaling engine, enhanced resolution versions of one or more subsequent frames are generated by the decoder in the enhanced resolution mode based on blocks of the enhanced resolution version of the key frame.

9. The device of claim 1, wherein the decoder further includes an upscaler configured to generate an upscaled residual of the block, and wherein the reconstruction engine is configured to use the upscaled residual during generation of the enhanced resolution version of the block.

10. The device of claim 1, wherein the decoder is configured to receive a motion vector of the block via a bitstream and to upscale the motion vector in the enhanced resolution mode.

11. The device of claim 10, wherein the decoder is configured to transfer enhanced resolution pixels based on the upscaled motion vector.

12. The device of claim 1, wherein the decoder is configured to:
receive a bitstream representation of a sequence of frames; and
for each particular frame of the sequence and during a single frame decoding time, reconstruct a base resolution version of the particular frame and generate an enhanced resolution version of the particular frame.

13. The device of claim 12, wherein the decoder is further configured to store the base resolution version of the particular frame and the enhanced resolution version of the particular frame in the decoded picture buffer.

14. The device of claim 13, wherein the decoder is configured to use the enhanced resolution version of the particular frame from the decoded picture buffer as source blocks for motion transfer in the enhanced resolution mode.

15. The device of claim 12, wherein the spatial prediction engine, the temporal prediction engine, and the reconstruction engine are included in a prediction engine of the decoder, and wherein the controller is configured to cause the decoder to:
during a first decoding time associated with a first particular frame of the sequence:
operate the prediction engine according to the base resolution mode to generate a base resolution version of the first particular frame; and
operate the prediction engine according to the enhanced resolution mode to generate an enhanced resolution version of the first particular frame; and
during a second decoding time that sequentially follows the first decoding time and is associated with a second particular frame that sequentially follows the first particular frame:
operate the prediction engine according to the base resolution mode to generate a base resolution version of the second particular frame; and
operate the prediction engine according to the enhanced resolution mode to generate an enhanced resolution version of the second particular frame.

16. The device of claim 1, further comprising a display device configured to play out an enhanced resolution version of frames generated by the decoder.

17. The device of claim 16, further comprising one or more speakers configured to play out audio associated with the frames.

18. The device of claim 1, further comprising a modem configured to receive a sequence of frames via a bitstream from an encoder device.

19. The device of claim 1, wherein the decoder and the controller are included in an integrated circuit.

20. The device of claim 1, wherein the decoder and the controller are integrated in a headset device.

21. The device of claim 20, wherein the headset device corresponds to at least one of a virtual reality headset, a mixed reality headset, or an augmented reality headset.

22. The device of claim 1, wherein the decoder and the controller are integrated in at least one of a mobile phone, a tablet computer device, or a wearable electronic device.

23. The device of claim 1, wherein the decoder and the controller are integrated in a vehicle.

24. A method comprising:
offloading, at a decoder, upscale of a key frame to an upscaling engine that is outside of the decoder;
performing an upscaling, at the upscaling engine that is coupled to the decoder, to a base resolution version of the key frame to generate an enhanced resolution version of the key frame;
reconstructing, at the decoder, a base resolution version of a block of a frame using a reconstruction engine and at least one of a spatial prediction engine or a temporal prediction engine of the decoder;
generating, at the decoder, a bypass control signal that indicates whether to offload upscaling the block to the upscaling engine or to generate an enhanced resolution version of the block using the reconstruction engine and at least one of the spatial prediction engine or the temporal prediction engine;
after reconstructing the base resolution version of the block, changing an operating mode of the decoder from a base resolution mode to an enhanced resolution mode; and
generating, at the decoder, based on the bypass control signal, the enhanced resolution version of the block based on the enhanced resolution version of the key frame.

25. The method of claim 24, wherein generating the bypass control signal is based on a comparison of an energy metric of a residual of the block to a dynamic threshold, wherein the dynamic threshold is based on a decay factor and a transfer distance from the enhanced resolution version of the key frame.

26. The method of claim 24, further comprising bypassing operation of one or more of an upscaler, the temporal prediction engine, the spatial prediction engine, or the reconstruction engine based on the bypass control signal.

27. The method of claim 24, wherein the upscaling engine includes a machine learning model that was trained to generate the enhanced resolution version of the key frame.

28. The method of claim 27, wherein, after obtaining the enhanced resolution version of the key frame, enhanced resolution versions of one or more subsequent frames are generated by the decoder operating in the enhanced resolution mode based on blocks of the enhanced resolution version of the key frame.

29. A non-transitory computer readable medium comprising instructions that, when executed by one or more processors, cause the one or more processors to:
offload, at a decoder, upscale of a key frame to an upscaling engine that is outside of the decoder;
perform an upscaling, at the upscaling engine that is coupled to the decoder, to a base resolution version of the key frame to generate an enhanced resolution version of the key frame;
reconstruct, at the decoder, a base resolution version of a block of a frame using a reconstruction engine and at least one of a spatial prediction engine or a temporal prediction engine of the decoder;
generate, at the decoder, a bypass control signal that indicates whether to offload upscaling the block to the upscaling engine or to generate an enhanced resolution version of the block using the reconstruction engine and at least one of the spatial prediction engine or the temporal engine;
after reconstructing the base resolution version of the block, change an operating mode of the decoder from a base resolution mode to an enhanced resolution mode; and generate, at the decoder, based on the bypass control signal, the enhanced resolution version of the block based on the enhanced resolution version of the key frame.

30. An apparatus comprising:
means for decoding, at a decoder, including reconstructing, in a base resolution mode, a base resolution version of a block of a frame using a reconstruction engine and at least one of a spatial prediction engine or a temporal prediction engine, wherein the means for decoding offloads upscaling of a key frame outside of the decoder;
means for performing the upscaling, at an upscaling engine that is coupled to the decoder, to the base resolution version of the key frame to generate an enhanced resolution version of the key frame;
means for generating, at the decoder, a bypass control signal that indicates whether to offload upscale of a block of a frame to the means for performing the upscaling or to generate an enhanced resolution version of the block using the reconstruction engine and at least one of the spatial prediction engine or the temporal prediction engine;
means for generating, at the decoder, in an enhanced resolution mode, based on the bypass control signal, the enhanced resolution version of the block based on the enhanced resolution version of the key frame; and
means for controlling an operating mode of the means for decoding.

* * * * *